US008316009B2

(12) United States Patent
Fraser et al.

(10) Patent No.: US 8,316,009 B2
(45) Date of Patent: Nov. 20, 2012

(54) GENERATING HISTOGRAMS OF POPULATION DATA BY SCALING FROM SAMPLE DATA

(75) Inventors: Campbell Bryce Fraser, Redmond, WA (US); Ian Jose, Redmond, WA (US); Peter Alfred Zabback, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/700,274

(22) Filed: Feb. 4, 2010

(65) Prior Publication Data

US 2010/0138407 A1    Jun. 3, 2010

Related U.S. Application Data

(62) Division of application No. 11/469,855, filed on Sep. 2, 2006, now Pat. No. 7,707,005.

(51) Int. Cl.
*G06F 17/30* (2006.01)
(52) U.S. Cl. ........................................ 707/713; 702/180
(58) Field of Classification Search .................. 707/713, 707/802; 702/180
See application file for complete search history.

(56) References Cited

U.S. PATENT DOCUMENTS

| | | | |
|---|---|---|---|
| 5,870,752 A | 2/1999 | Gibbons et al. | |
| 6,012,064 A | 1/2000 | Gibbons et al. | |
| 7,324,925 B2 | 1/2008 | Bonvicini | |
| 7,392,156 B2 | 6/2008 | Weber | |
| 2006/0047683 A1 | 3/2006 | Lakshminarayan et al. | |
| 2007/0220017 A1 | 9/2007 | Zuzarte et al. | |

OTHER PUBLICATIONS

OA dated Mar. 6, 2009 for U.S. Appl. No. 11/469,855, 34 pages.
OA dated Nov. 14, 2008 for U.S. Appl. No. 11/469,855, 49 pages.
OA dated May 14, 2008 for U.S. Appl. No. 11/469,855, 30 pages.

*Primary Examiner* — Huawen Peng
(74) *Attorney, Agent, or Firm* — Zete Law, P.L.L.C.; MacLane C. Key

(57) ABSTRACT

Histograms formed based on samples of a population, such as histograms created from random page-level samples of a data store, are intelligently scaled to histograms estimating distribution of the entire population of the data store. As an optional optimization, where a threshold number of duplicate samples are observed during page-level sampling, the number of distinct values in the overall population data is presumed to be the number of distinct values in the sample data. Also, during estimation of distinct values of an overall population, a "Chao" estimator can optionally be utilized as a lower bound of the estimate. The resulting estimate is then used when scaling, which can take domain knowledge of the data being scaled into account in order to prevent scaled estimates from exceeding the limits of the domain. Also, a "sum of the parts" mathematical relationship can be taken into account during scaling that the sum of the scaled distinct values for each bin of an estimate histogram should total an estimate for the total distinct values of the entire population.

20 Claims, 19 Drawing Sheets

GENERATING HISTOGRAMS OF POPULATION DATA BY SCALING FROM SAMPLE DATA

CROSS REFERENCE TO RELATED APPLICATIONS

This application is a divisional of U.S. patent application Ser. No. 11/469,855, filed on Sep. 2, 2006, entitled "GENERATING HISTOGRAMS OF POPULATION DATA BY SCALING FROM SAMPLE DATA", the entirety of which is incorporated herein by reference.

TECHNICAL FIELD

The subject invention relates to the generation of histograms of population data by scaling from sample data, e.g., generating a histogram of an entire population of data by scaling from a histogram of sample data randomly selected from the population.

BACKGROUND

A query is a standard way to retrieve one or more desired subsets of data from a data store. As shown by FIG. 13A, a query 1305 can originate from any computing environment 1300 where there is a framework to interface with data store 1320. In this regard, computing environment 1300 may include any number of computing devices and architectures, e.g., client/server, whether networked or standalone, which may implicate the execution of query 1305 against data store 1320. Historically, the execution of query 1305 has evolved to include an extra step prior to execution of the query: optimization of the query execution plan, i.e., optimizing the way the query is executed.

After receipt of a query 1305 from a computing environment 1300, there are a variety of optimization techniques that can be applied by a query optimizer 1310 to query 1305 to form an efficient query execution plan 1315. For instance, some existing techniques try to form a query execution plan 1315 that implicates a minimal number of page accesses, or reads, from the data store 1320 during execution of the query 1305. Other optimization techniques try to leverage pre-existing auxiliary data store structures 1330, such as indexes, histograms, re-ordered tables, alphabetized tables, etc., which are generated in advance and can be used to substantially improve the efficiency of query execution, especially certain types of queries.

For a simple example showing the efficacy of auxiliary structures 1330, if a query 1305 requests all customers from a data store 1320 with a name starting with the letter "K," one can appreciate that having access to a histogram including a "K" bucket, which shows that there are no customers having a name starting with the letter "K," would help to streamline execution of the query. Clearly, consultation of the histogram first would be preferable over an exhaustive search of every row of the entire customer table in data store 1320 only to find that none of the rows include such entries. With the histogram, such information is obtainable directly.

In addition, the benefits of optimizing queries by using auxiliary data structures, such as histograms, tend to increase with the complexity of query 1305 itself and the corresponding amount of heavy manipulation of data that is involved. For instance, in the above example, if there are 50,000 customer rows, having a histogram that buckets according to letters will save a lot of time relative to an exhaustive search of all 50,000 customer rows when executing the query. This is because costs associated with memory access time and data computation time can become significant for more exhaustive, non-optimized approaches as the complexity of the query increases and the number of rows involved increases, making optimization comparatively worth the effort.

Accordingly, query optimizer 1310 can benefit significantly from the existence of auxiliary data store structures 1330, such as histograms, which can be used to forecast information about the data store 1320 quickly and accurately. However, due to time constraints and the like, the cost of creating an exact auxiliary data structure representing the entire population of data store 1320 may be too high. Thus, sometimes it is desirable to estimate the auxiliary data store structures 1330 based on sample population data, e.g., to estimate the hypothetical histogram representing the whole population based on a relatively small sample (e.g., 1-10%) of the population.

This is done, for instance, in the context of relational database systems that have query optimizers that attempt to estimate how many rows will be processed by a given query. In this regard, the number of rows that will be processed for a given query execution plan corresponds to how quickly a query can be executed, and thus this information can be used to compare query execution plans quickly. Today, these "number of row" estimations are made using statistical information on the data in the database, which is typically stored as histogram information that captures the distribution of values for particular objects, e.g., columns, such as "salary" or "order size".

While there are many ways to represent a histogram, some with more information than others, for illustrative purposes, a hypothetical histogram 1360 for "order size" is provided as an example for consideration in FIG. 13B. As shown, histogram 1360 includes 7 uniformly spread buckets B1, B2, B3, B4, B5, B6 and B7, which represent buckets of orders of size 1-10 items, 11-20 items, 21-30 items, 31-40 items, 41-50 items, 51-60 and 61-70 items, respectively. The order size of 60 total orders is shown as distributed across the six buckets. The x-axis specifies ranges for the size of orders and the y-axis is the number of orders in the corresponding size range. For instance, histogram 1360 reflects that there are 24 orders that include anywhere from 21 to 30 items.

While creating a histogram for 60 total orders is not too time consuming, the cost of creating an exact histogram over an enormous amount of potentially changing data, e.g., 1,000,000+ rows, in an overall database population can be high, if not prohibitive. In such situations, histograms of the overall population data are generated based on estimates from representative samples in the database. For instance, as shown in FIG. 13C, a sample of Column C of a Table T is created by taking a random subset of pages from pages P1, P2, P3, P4, ..., PN of Table T and examining the value of C for every row in each sampled page. Because the representative sample is taken from a random set of pages and not a random set of rows, it is called a page-level sample. In general, page-level samples provide a less representative picture of the data set than the same number of row-level samples, but page-level samples are much faster to produce because far fewer pages are loaded from disk.

Thus, histograms for distributions of columns of a table can be generated based on page-level samples and stored on disk as histogram data structures. For example, if a table has 1,000,000 rows and a sample has 10,000 rows, then the histograms for the columns of the table will each represent 10,000 rows. Then, when a database system estimates the number of rows from a table T that will qualify for a condition on a particular column C, e.g., as part of execution of a query, the system loads the histogram based on the page-level samples taken for C.

Then, according to a naïve algorithm, current systems scale the histogram produced based on the page-level samples for the column C to a representation that estimates the actual histogram for the entire set of data in C across all pages, i.e., current systems scale to an estimate of the actual histogram of all 1,000,000 rows of the table. If the representation is an accurate estimate of the actual histogram of the entire set of data for C, the estimate can then be used effectively to optimize execution of a query based on column C. However, today's approach to this scaling often results in a bad estimate, which causes queries to execute according to a sub-optimal query execution plan.

In addition to the number of samples in each bucket, histograms sometimes also represent the number of distinct values in each bucket. For instance, if a bucket for a histogram that ranges from 10 to 100 includes the values {25, 90, 25, 25, 3, 90}, then the bucket includes six values, but only three distinct values. In such cases, these numbers representing the distinct values per sample bucket are also scaled to estimates of the distinct values per bucket of the histogram of the overall population. Today, this scaling commonly consists of using the following formula to calculate the distinct value estimator D:

$$d = D\left(1 - \left(1 - \frac{1}{D}\right)^n\right)$$

where D represents the estimated number of distinct values in the entire population, d represents the number of distinct values in the sample population and n represents the size of the sample population.

Currently, given d and n, there is no closed form for calculating D. Accordingly, an iterative approach can be utilized to approximate a solution to the above formula. However, predicating scaling of page-level sample histograms to an overall population solely upon the above formula is a somewhat naïve approach. The naivety of that scaling results in inaccuracies in these estimations, particularly since the above scalar is applied to each step (i.e., each bin of the sample histogram). Accordingly, if the scalar based on the above formula for D is skewed, that skew is propagated to each of the steps of the histogram estimating the population. Better ways of scaling a histogram based on samples of a population to an estimate of the actual histogram of the entire population are thus desired.

These and other deficiencies in the state of the art of histogram scaling will become apparent upon description of the various exemplary non-limiting embodiments of the invention set forth in more detail below.

SUMMARY

In consideration of the foregoing, the invention provides a method to intelligently scale histograms formed based on samples of a population, such as histograms created from random page-level samples of a data store, to histograms estimating distribution of the entire population of the data store. As an optional optimization, where a threshold number of duplicate samples are observed during page-level sampling, the number of distinct values in the overall population data is presumed to be the number of distinct values in the sample data. Also, during estimation of distinct values of an overall population, a "Chao" estimator can optionally be utilized as a lower bound of the estimate.

In various non-limiting embodiments described herein, the resulting estimate of distinct population values is then used when scaling, which can take domain knowledge of the data being scaled into account in order to prevent scaled estimates from exceeding the limits of the domain. Also, a "sum of the parts" mathematical relationship can be taken into account during scaling that the sum of the scaled distinct values for each bin of an estimate histogram should total an estimate for the total distinct values of the entire population.

A simplified summary is provided herein to help enable a basic or general understanding of various aspects of exemplary, non-limiting embodiments that follow in the more detailed description and the accompanying drawings. This summary is not intended, however, as an extensive or exhaustive overview. The sole purpose of this summary is to present some concepts related to the various exemplary non-limiting embodiments of the invention in a simplified form as a prelude to the more detailed description that follows.

BRIEF DESCRIPTION OF THE DRAWINGS

The system and methods for scaling histograms are further described with reference to the accompanying drawings in which.

DETAILED DESCRIPTION

Figure 1:
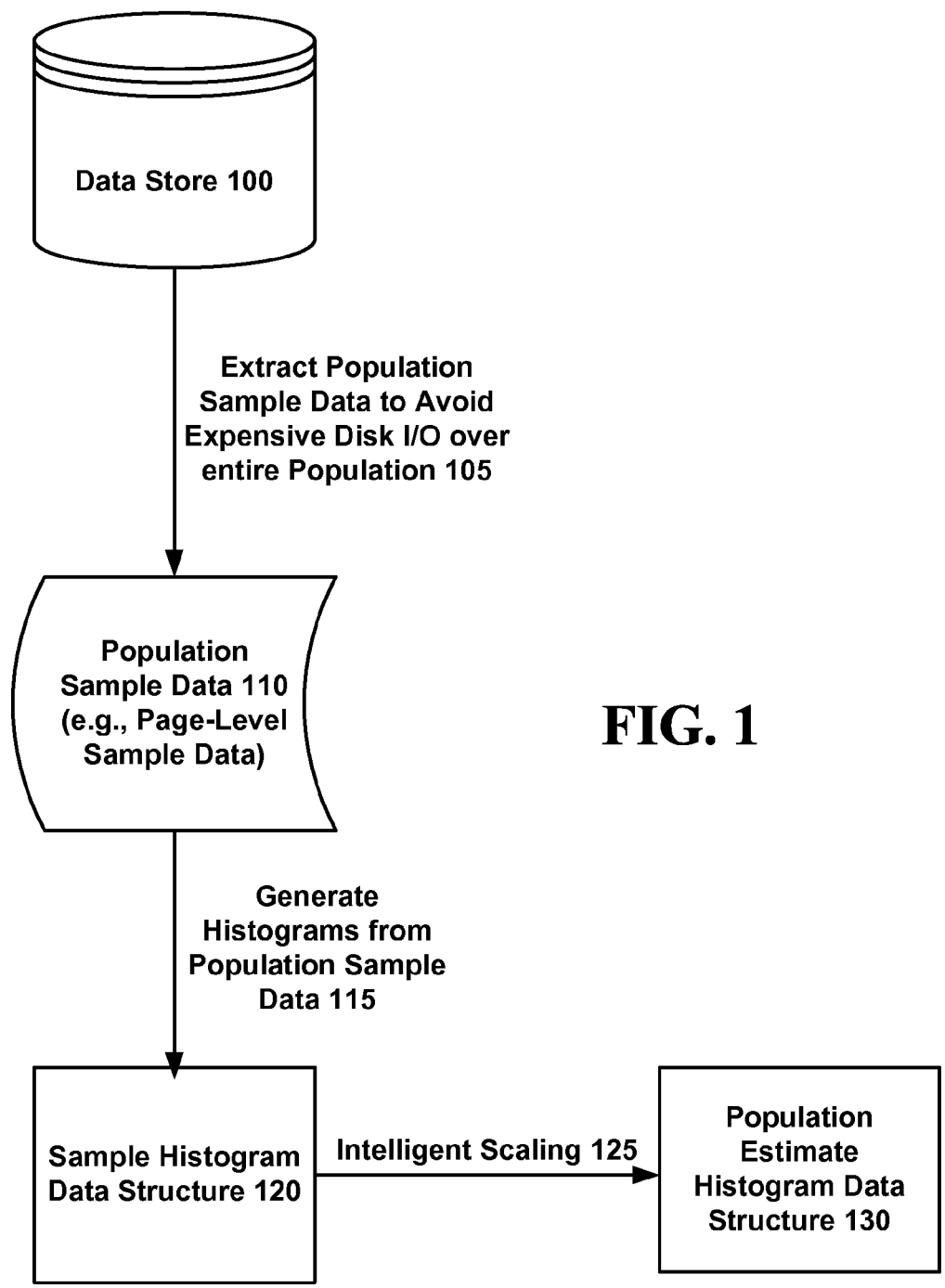
FIG. 1 illustrates an exemplary process for scaling a histogram based on population sample data to histogram estimate of the overall population in accordance with the invention.

As mentioned in the background, current methods for scaling a histogram based on sample data from a population to an estimate of the actual histogram that would represent the entire population, if calculated in an exhaustive manner, are unsophisticated. In consideration of the deficiencies associated with scaling techniques predicated on a commonly employed distinct value estimator D, the invention applies more accurate and efficient scaling methods to histograms based on sample population data that generate representative (i.e., estimated) histograms of the entire population data for any data store. In various exemplary, non-limiting embodiments, the invention scales a histogram that was created using data contained in random page-level samples of a data store, such as a relational database table, into a histogram that is representative of the entire data store.

In various non-limiting embodiments of the invention, the representative histograms may be used in connection with optimizing queries over the population data, i.e., optimizing query execution plans for queries over the data store. While exemplary embodiments are described herein in the context of relational databases, such as structured query language (SQL) server, the invention can be applied to generate representative histograms of population data in any kind of data store. Moreover, the population data can be stored according to any format, e.g., different relational formats, extensible markup language (XML) files, flat file, multi-dimensional tables, etc.

In one non-limiting aspect, where a relatively high number of duplicate samples are observed during page-level sampling, the number of distinct values in the overall population data is presumed to be the number of distinct values in the sample data. In another non-limiting aspect, the scaling of the invention takes into account domain knowledge of the data being scaled, to prevent scaled estimates from exceeding the limits of the domain, e.g., for integer data, there can be no more than (X−Y−1) distinct values between two integers X and Y.

In another non-limiting aspect, the invention ensures the mathematical relationship that the sum of the scaled distinct values for each bin of an estimate histogram totals an estimate for total distinct values of the entire population, optionally redistributing scaled values across bins to preserve the relationship. In still another exemplary, non-limiting aspect, a Chao estimator of a population based on a sample population is optionally utilized as a lower bound of an estimate of the total number of distinct values in the population utilized during the scaling processes of the invention. More detail respecting the mathematics of the Chao estimator can be found in A. Chao, "Nonparametric Estimation of the Number of Classes in a Population", Scandinavian Journal of Statistics, Theory and Application, Vol. 11, pp. 265-270. Moreover, the formula for the Chao estimator is given below in connection with the description of FIG. 6 and accordingly, where the term "Chao estimator" is used herein, it should be noted that the term refers to that formula.

As shown in FIG. 1, the invention relates to a system in which a sample histogram data structure 120, generated from sample population data from data store 110, is scaled according to intelligent algorithms 125 provided in accordance with the invention to produce a corresponding population estimate histogram data structure 130. Accordingly, for some queries Q that can be executed more simply, or efficiently, by using the corresponding population estimate histogram data structure 130, optimization component 102 of data store server 100 will utilize population estimate histogram data structure 130 in connection with formulating query execution plan 105 against data store 110.

Figure 2:
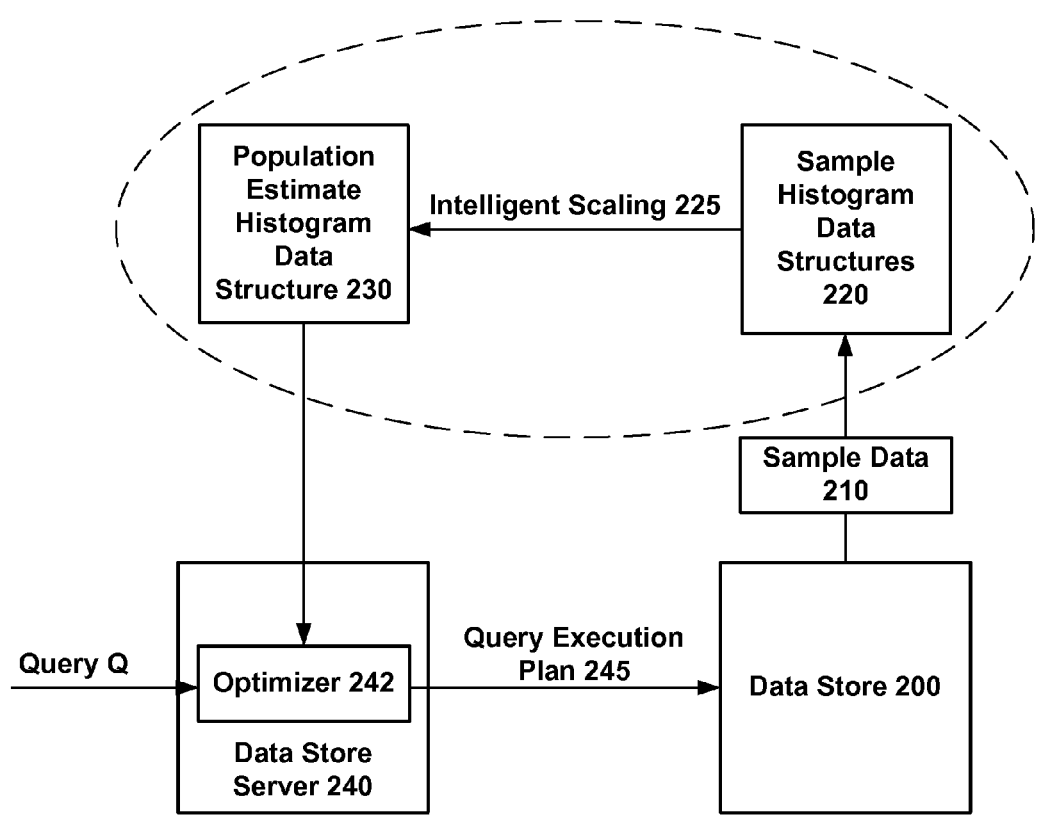
FIG. 2 illustrates an exemplary process for using a scaled histogram to optimize queries against a data store in accordance with the invention.

FIG. 2 illustrates an exemplary process for using a scaled histogram to optimize queries against a data store in accordance with the invention. In such a context, the invention can be used in connection with optimizing queries Q by an optimizer 242 of a data store server 240 that services queries against data store 200 by determining an optimal query execution plan 245. In operation, sample data 210 is extracted from data store 200, such as page level sample data. Histograms 220 are then constructed from sample data 210, which takes a lot less time than creating a histogram of the entire population data of data store 200. Then, the intelligent scaling 225 of the invention can be applied to accurately estimate a histogram 230 that represents the entire population.

Figure 3:
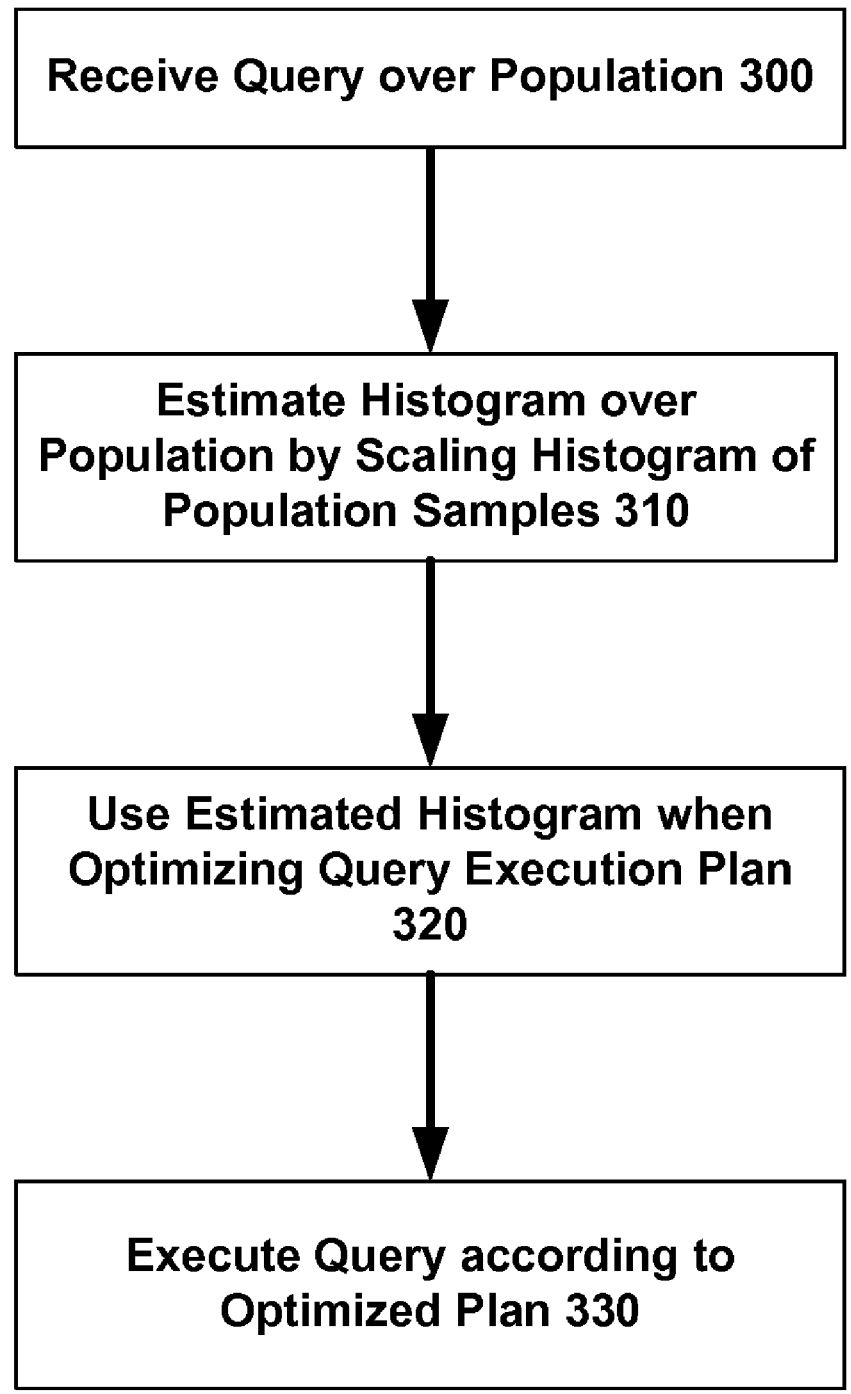
FIG. 3 is an exemplary, non-limiting flow diagram illustrating a process for optimizing queries using a scaled histogram in accordance with the invention.

FIG. 3 is an exemplary, non-limiting flow diagram illustrating a process for optimizing queries using a scaled histogram in accordance with the invention. At 300, a query is received to be executed over population data in a data store. At 310, the invention estimates a population histogram by scaling a histogram generated from population samples. At 320, the estimated histogram is utilized by an optimizer to optimize a query execution plan for the query received at 300. The query is then executed according to the optimized plan at 330, much faster than if no estimate of the population histogram is available.

Figure 4:
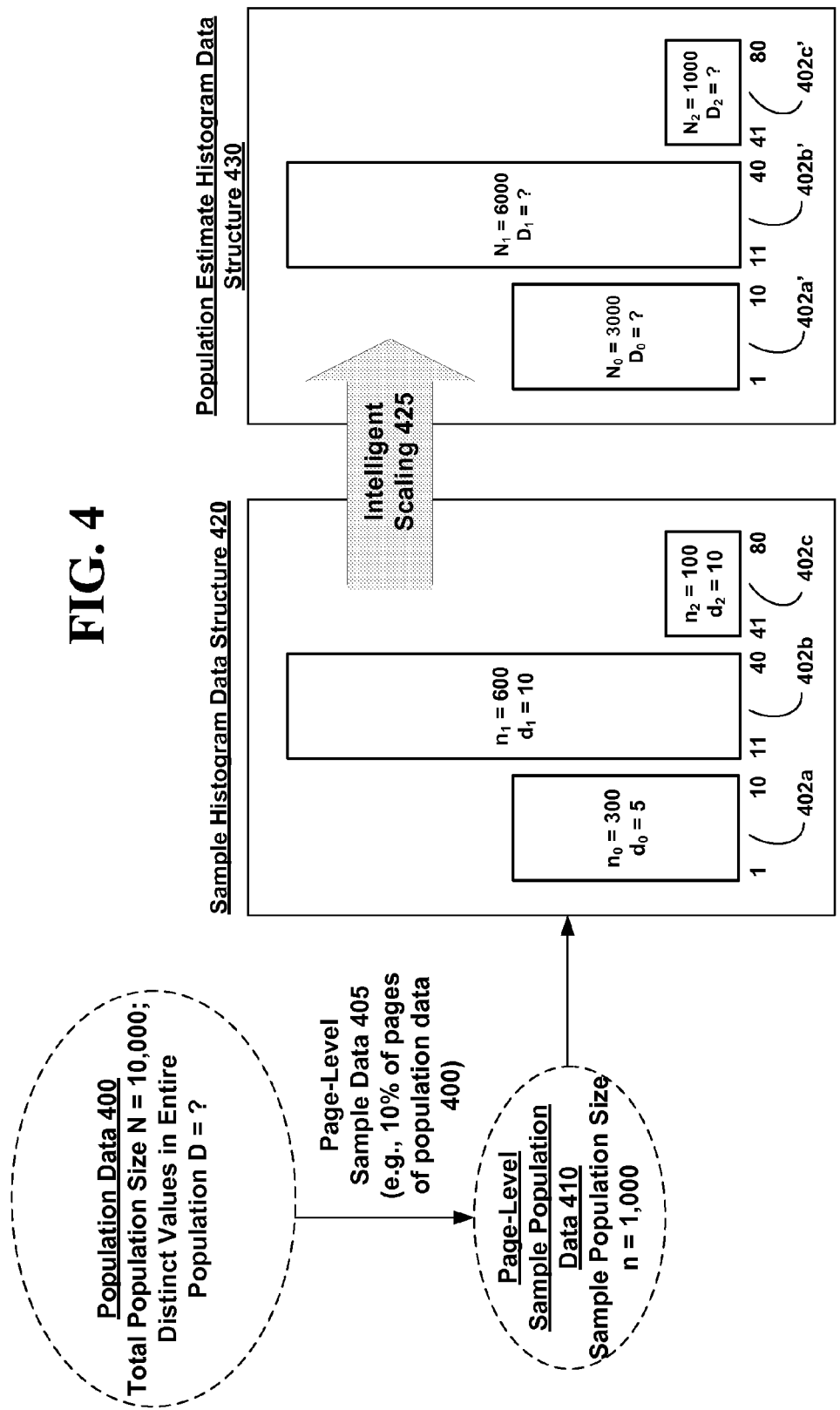
FIG. 4 is an exemplary, non-limiting block diagram illustrating processes for scaling population sample histogram data in accordance with the invention.

FIG. 4 is a general illustration of an exemplary implementation of the invention in the context of sample histograms generated from page level samples from population data 400. As shown, page-level sample data 405 is extracted from population data 400 to form page-level sample population data 410. For a hypothetical example, population data 400 may include a population size of 10,000 rows. However, the number of distinct values of the 10,000 rows is unknown. Thus, in one aspect of the invention, for use in scaling, the number of distinct values of the entire population 400, here 10,000 rows, is estimated. For the sake of the present example, it is assumed that reading 10,000 rows from memory is expensive, but 1,000 rows from page-level sample data 405 is not. One of ordinary skill in the art can appreciate that these exemplary numbers are used here for ease of illustration, and that actual numbers of rows implicated by a query may be much more.

From the page-level sample population data 410, a sample histogram data structure 420 is generated. In this simple example, the histogram data structure 420 includes only three bins (also called buckets, or steps) 402a, 402b and 402c. In this representation of histogram data structure 420, in addition to recording the number of occurrences of values in the sample population 410 in each bin 402a, 402b and 402c as $n_0=300$, $n_1=600$ and $n_2=100$, respectively, the number of distinct values in each bin is also recorded as $d_0=5$, $d_1=10$ and $d_2=10$, respectively.

As mentioned above, the intelligent scaling 425 of the invention then operates to scale values of histogram data structure 420 to estimate a histogram data structure 430 that is representative of the entire population. Where the total population size is 10,000, and the sample size is 1,000, the bin occurrences $n_i$ for the sample data are scaled by a factor of 10 (10,000/1,000) to produce the estimates of bin occurrences $N_i$ for the population data. For instance, buckets 402a', 402b' and 402c' of population histogram 430 reflect scaled numbers of $N_0=3000$, $N_1=6000$ and $N_2=1000$. What is more naively performed today, however, is the scaling of the distinct values in the sample bins to the distinct values of the bins of the overall population histogram. Accordingly, as described in more detail below, the invention applies more intelligent algorithms and heuristics that can be used to improve the accuracy of the estimate of the population histogram when scaling from sample data, by improving the estimates of $D_0$, $D_1$ and $D_2$ of histogram data structure 430.

Figure 5:
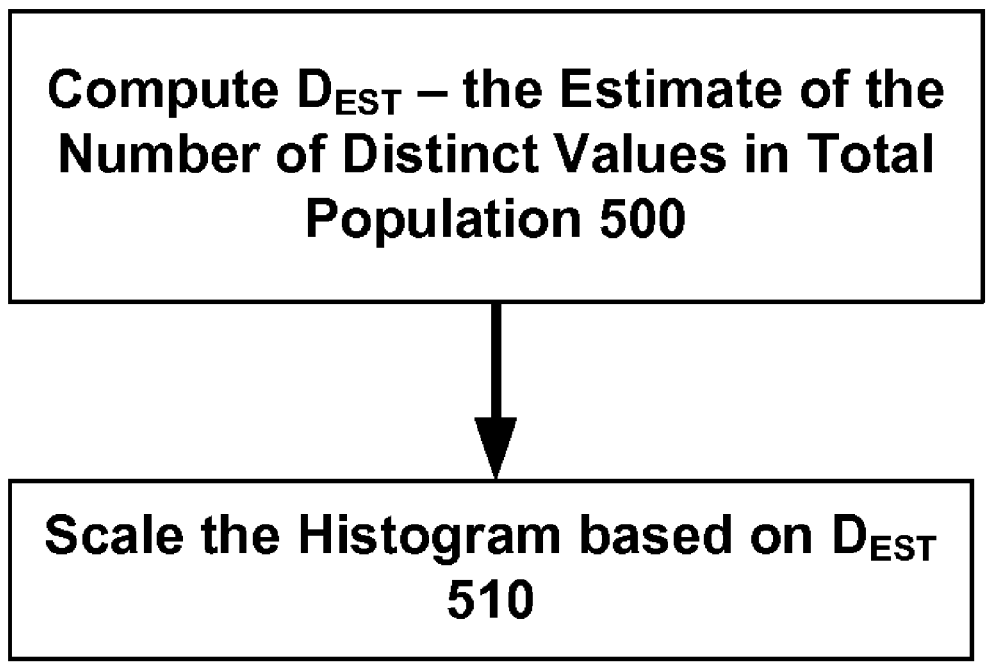
FIG. 5 is an exemplary, non-limiting flow diagram illustrating a two stage process for scaling a population sample histogram to an overall population histogram in accordance with the invention.

In the various exemplary, non-limiting embodiments of the invention, a two stage process is implemented for scaling a population sample histogram to an overall population histogram, which is shown in the flow diagram of FIG. 5. At 500, the first stage is represented where $D_{EST}$ is calculated from the sample population data. $D_{EST}$ is an estimate of the number of distinct values in the overall population, which is produced from the population sample data, e.g., page-level samples. In essence, if $D_{EST}$ is poorly determined, the scaling process will be skewed resulting in an inaccurate population histogram. AT 510, the second stage is represented where the sample histogram is scaled based on $D_{EST}$ in order to produce the estimate of the population histogram. Improvements in estimating $D_{EST}$ and other optimizations applied to the scaling process are described in more detail below.

Figure 6:
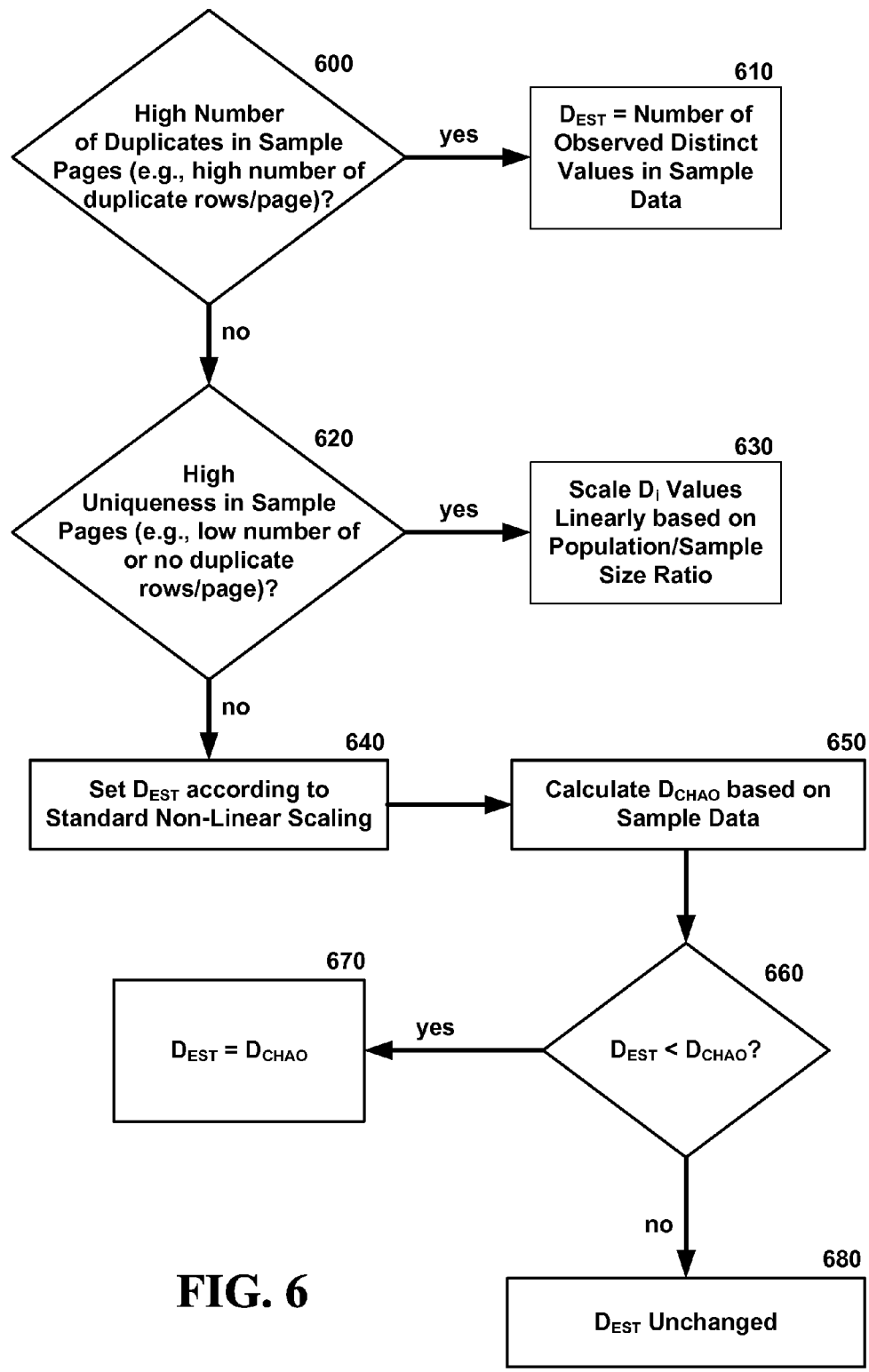
FIG. 6 is an exemplary, non-limiting flow diagram illustrating various aspect(s) of intelligent estimation of a scaling factor utilized in accordance with scaling processes of the invention.

FIG. 6 is an exemplary, non-limiting flow diagram illustrating processes that can be used to improve estimation of $D_{EST}$ in accordance with the invention. Given a sample population, at 600, the invention determines whether a high number of duplicates are present in the sample pages, e.g., if there are a high number of duplicate rows per sample page. In one embodiment, if the average unscaled frequency of population data spans more than a predetermined number of pages, e.g., 4 pages, then at 610, $D_{EST}$ is presumed to be the same as the number of distinct values in the population sample data. If not, then at 620, in contrast to the determination at 600, in one non-limiting implementation, it is determined whether the samples are highly unique, or contains few duplicate values, in which case it is presumed that $D_{EST}$ can be obtained from linearly interpolating from the sample data at 630. If not, then at 640, $D_{EST}$ is calculated per the commonly used non-linear scaling formula described in the background. In this respect, steps 600 and 620 guard against statistical skew of the population data from impacting performance of that non-linear scaling formula, or any other scaling formulas as well.

FIG. 6 illustrates another optional implementation of the invention in which the Chao estimator is used at 650 after performing the initial estimate of $D_{EST}$ at 640 to check the lower bound of $D_{EST}$. The lower bound estimator, also called Chao's estimator for D, is given as follows:

$$D = d + \frac{f_1^2}{2f_2}$$

where D and d are the same as for the non-linear distinct value estimator given in the background, $f_1$ is the number of values that appear exactly once in the sample (i.e., number of unique values) and $f_2$ is the number of values that appear exactly twice in the sample.

In accordance with the invention, after calculating $D_{CHAO}$ at 650, then at 660, it is determined whether $D_{EST}$ is less than $D_{CHAO}$, and if so, then $D_{EST}$ is set equal to $D_{CHAO}$ at 670, and if not, then $D_{EST}$ remains unchanged at 680.

Figure 7:
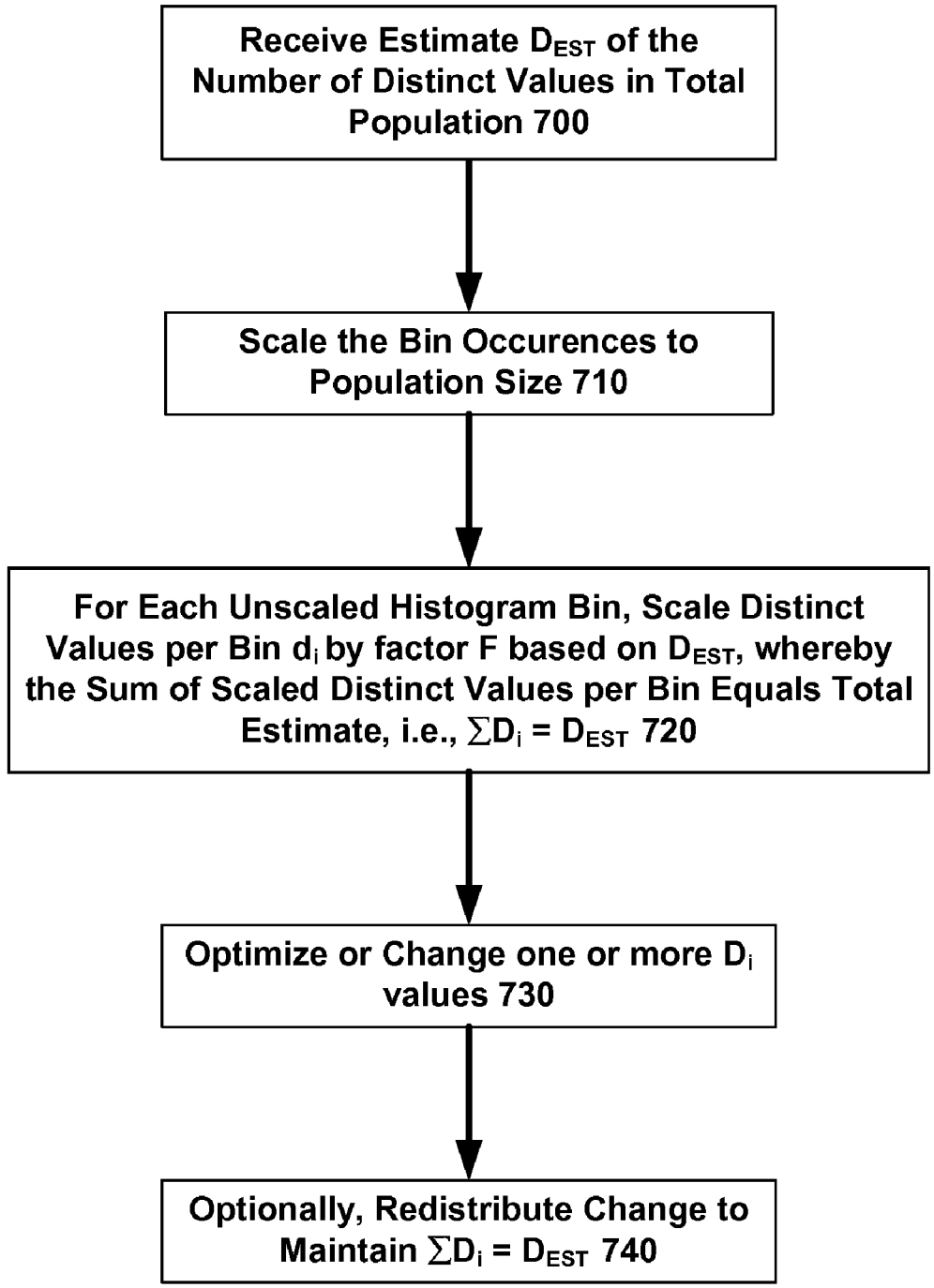
FIG. 7 is an exemplary, non-limiting flow diagram illustrating limitation of a sum of individual scaled estimates for bins of the histogram to an estimate of the total for the whole histogram in one aspect of the invention.

FIG. 7 is an exemplary, non-limiting flow diagram illustrating another aspect of the invention. In this regard, as described above, at 700, $D_{EST}$ is estimated and at 710, the bin occurrences for the sample bins are scaled to the appropriate estimates of bin occurrences for the entire population size. Notably, in accordance with the invention, in contrast to the current systems that scale each bin independently of one another, at 720, the invention maintains the relationship that the sum of individual scaled estimates for bins of the histogram should equal the estimate of the total for the whole histogram. In this regard, this is applied when scaling the individual estimates of distinct values for each of the sample bins, i.e., the invention preserves the relationship, when scaling, that the sum of scaled distinct values per sample bin should equal the total estimate, i.e., $\Sigma D_i = D_{EST}$.

Still further, at 730, various further optimizations of scaling performed in accordance with the invention may change the scaling performed at 720. Optionally, at 740, the change can be redistributed to the other estimates of distinct values for each of the sample bins, i.e., in response to a change, the invention can still operate to preserve the relationship: $\Sigma D_i = D_{EST}$.

Figure 8:
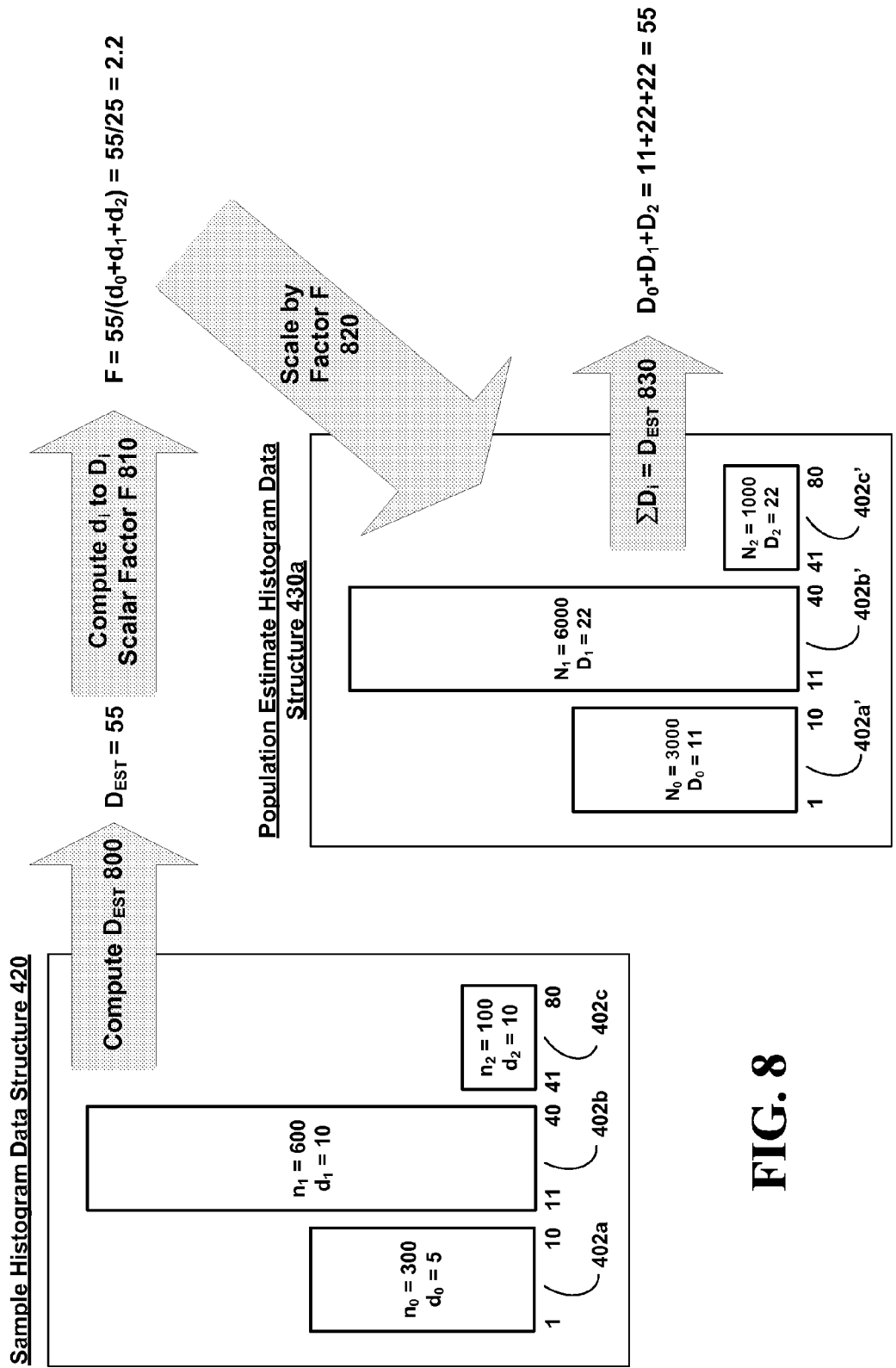
FIG. 8 is an exemplary, non-limiting block diagram illustrating exemplary scaling of a population sample histogram to an estimate histogram for the population by maintaining a pre-determined mathematical relationship in accordance with the invention.

FIG. 8 is an exemplary, non-limiting block diagram illustrating exemplary scaling of a population sample histogram to an estimate histogram for the population by maintaining the above-mentioned pre-determined mathematical relationship in accordance with the invention. As shown, the sample histogram data structure 420 is shown from FIG. 4 with the same hypothetical histogram. After applying the first stage of the invention to estimate $D_{EST}$ at 800, $D_{EST}=55$. In accordance with the invention, $D_{EST}$ is used when scaling the distinct values per bin. In a non-limiting implementation, $F=D_{EST}/\Sigma d_i=55/25=2.2$, which is determined at 810. Scaling by factor F at 820, i.e., $d_i*2.2=D_i$, yields $D_0=11$ (5*2.2), $D_1=22$ (10*2.2) and $D_2=22$ (10*2.2) for bins 402a', 402b' and 402c' of population estimate histogram data structure 430a. In this regard, as demonstrated at 830, the condition that the sum of the scaled values $\Sigma D$, equals the estimated value for the population $D_{EST}$ is maintained, i.e., 11+22+22=55.

Figure 9A:
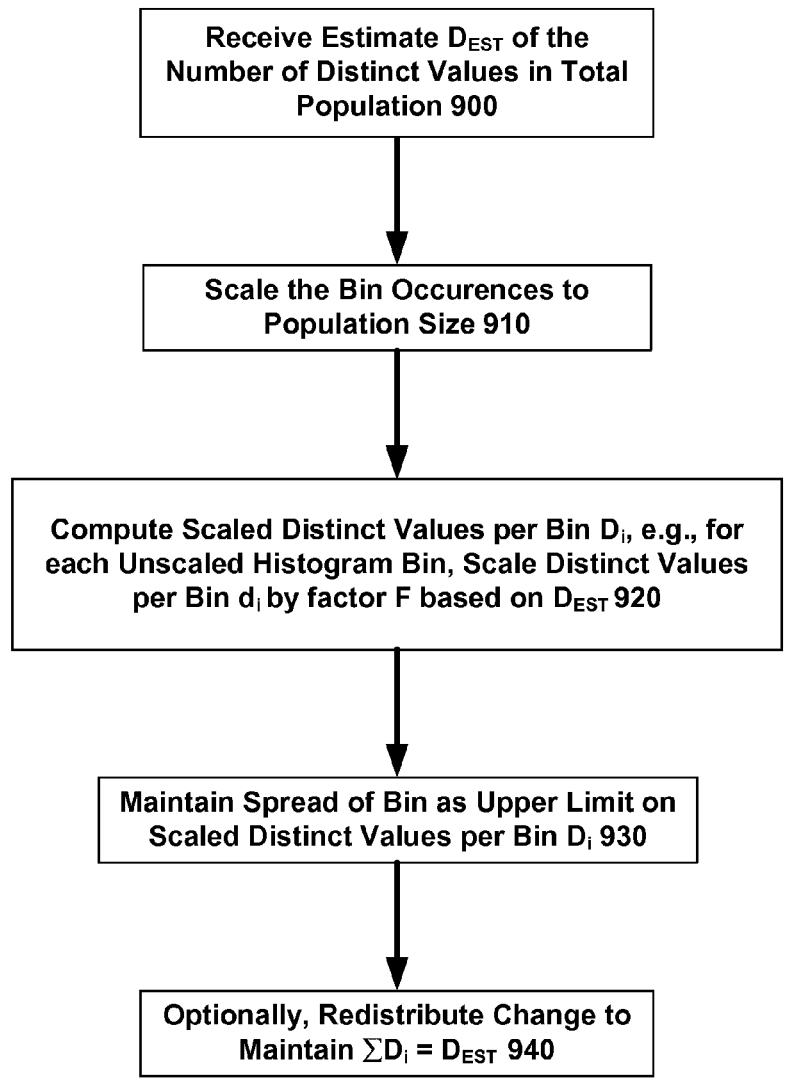
FIGS. 9A and 9B illustrate exemplary aspects of maintaining limits of estimates based on known domain limits in accordance with the invention.
Figure 9B:
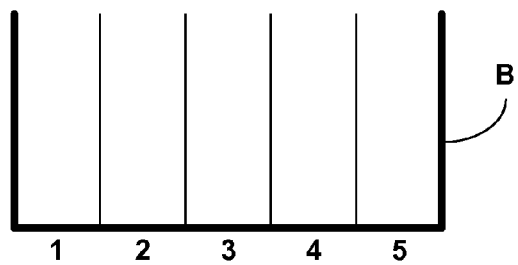

FIGS. 9A and 9B is an exemplary, non-limiting flow diagram illustrating exemplary aspects of maintaining limits of estimates based on known domain limits in accordance with the invention. In this regard, similar to before, at 900, $D_{EST}$ is estimated and at 910, the bin occurrences for the sample bins are scaled to the appropriate estimates of bin occurrences for the entire population size. Then, at 920, the invention scales the individual estimates of distinct values for each of the sample bins based on factor F.

It has been observed, however, that the values $D_i$ can be estimated as impossible values, i.e., exceeding the possibilities enabled by the domain for which they are estimated. For a hypothetical example, the bucket B of FIG. 9B demonstrates domain knowledge applied by the invention. Bucket B includes five possible distinct integer values for the range 1 to 5. If bucket B were a sample bucket for a sample histogram to be scaled by the invention, and the scaled estimate $D_i$ of the number of distinct values for the bucket B was determined at 920 to be 7, then in accordance with the invention, the scaled estimate $D_i$ would be known to be incorrect at 930. In this regard, the maximum that the estimate $D_i$ for bucket B could be is 5, since there are only five possible distinct values defined for the domain: 1, 2, 3, 4, and 5. The range of bucket B is known as the spread.

Accordingly, at 930, the invention operates to maintain the spread of the bins as an upper limit on the scaled distinct values per bin $D_i$. Then, at 940, any change to the $D_i$ values can again be redistributed to the other estimates of distinct values for each of the sample bins, i.e., in response to a change, the invention may still operate to preserve the relationship: $\Sigma D_i = D_{EST}$.

Figure 10A:
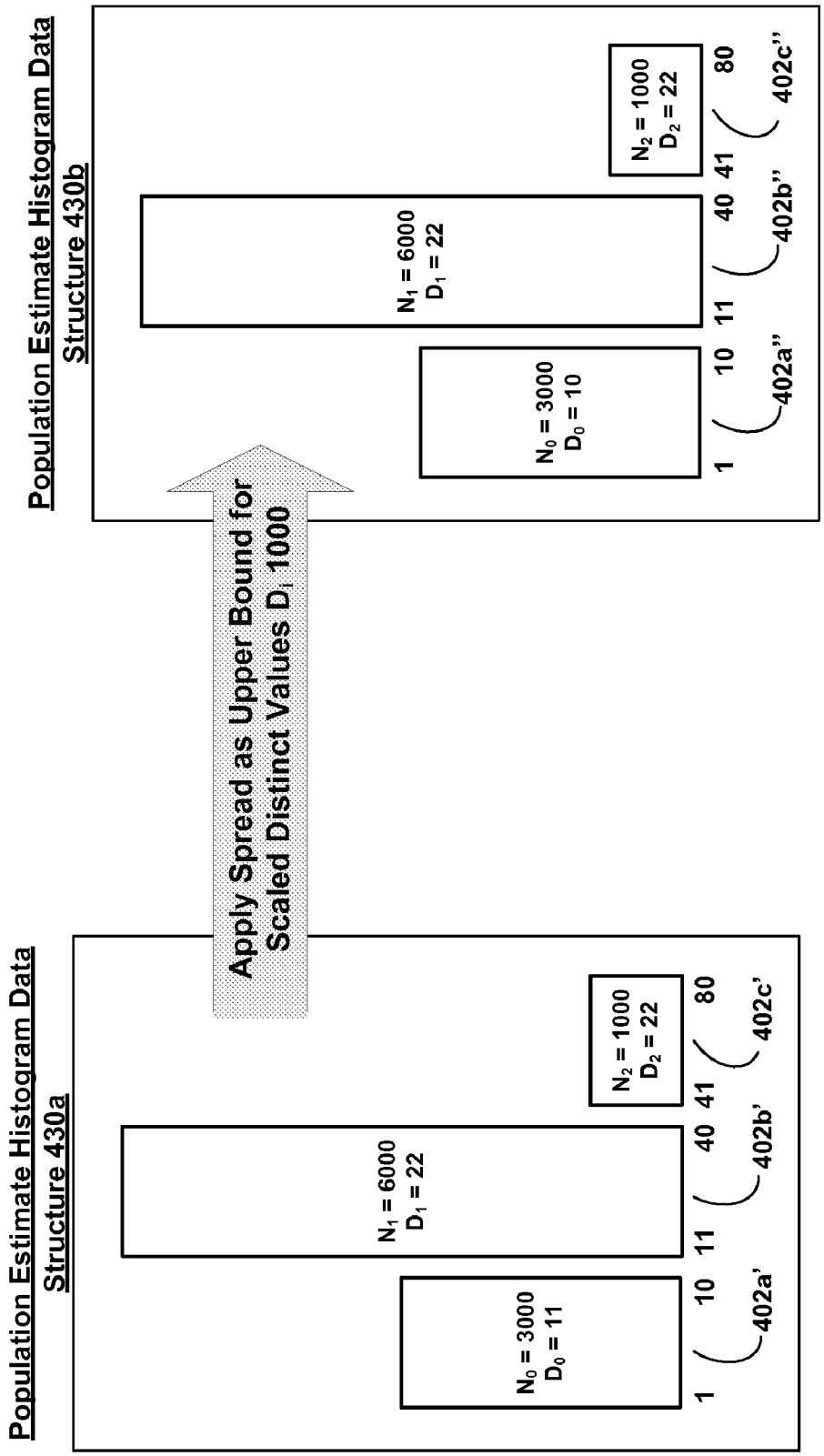
FIGS. 10A and 10B illustrate exemplary modification of an estimate histogram for an entire population and corresponding redistribution of the change due to the modification to other bins of the histogram to maintain a pre-determined mathematical relationship in accordance with the invention.
Figure 10B:
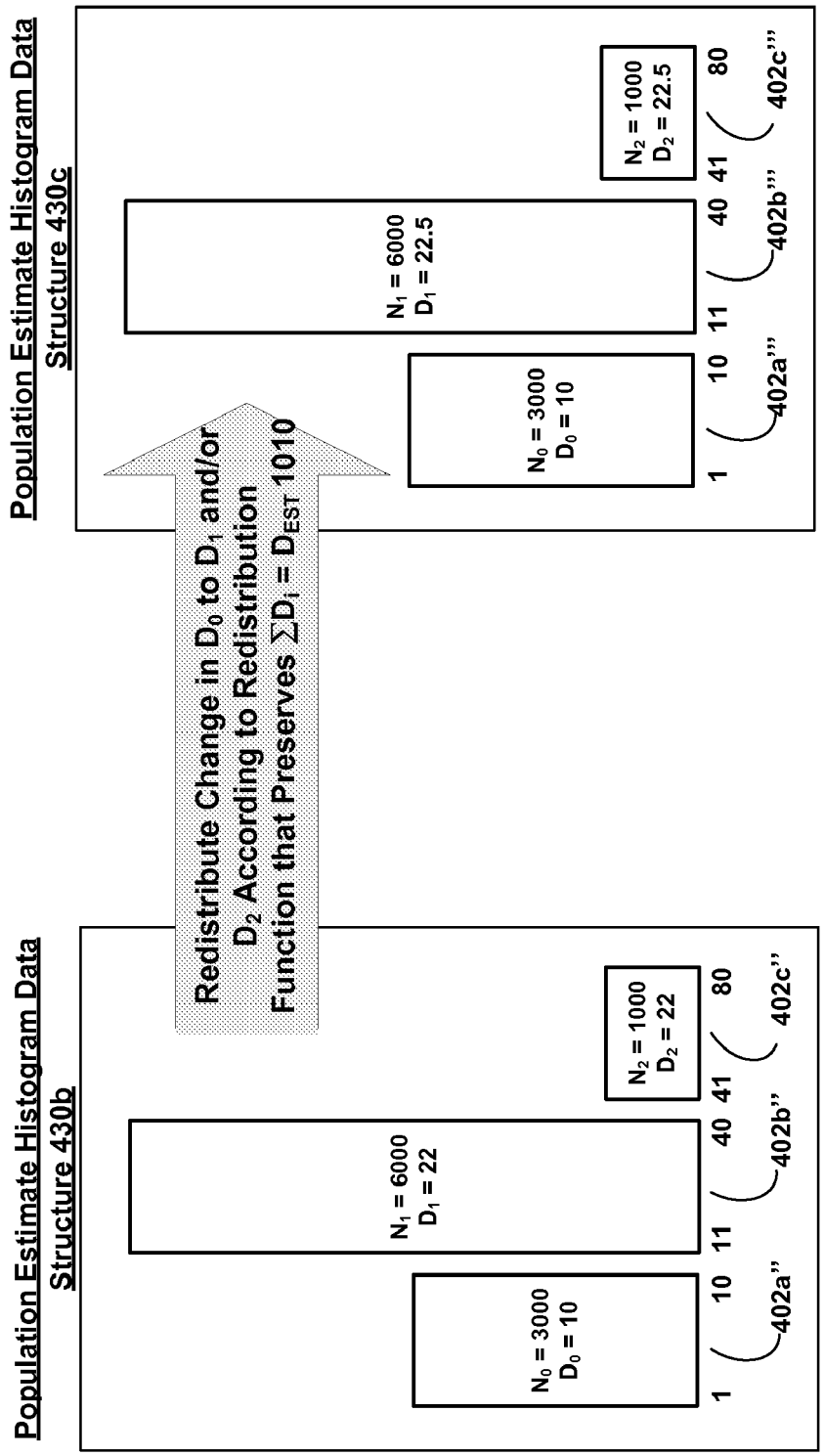

FIGS. 10A and 10B illustrate exemplary modification of an estimate histogram for an entire population and corresponding redistribution of the change due to the modification to other bins of the histogram to maintain a pre-determined mathematical relationship in accordance with the invention. FIG. 10A illustrates that histogram data structure 430*a* of FIG. 8 can be optimized further by applying the above-described spread determination as an upper bound for the distinct values $D_i$ at 1000. Step 1000 thus produces population histogram data structure 430*b*, which recognizes that $D_0$ cannot be 11, since only 10 distinct values are possible in the domain defined for bin 402*a'*. Accordingly, in structure 430*b*, $D_0$ is set to 10, since 11 is not possible. However, $\Sigma D_i = D_{EST}$ no longer holds true because $\Sigma D_i = 54$ instead of 55 for bins 402*a''*, 402*b''* and 402*c''*.

Thus, in further embodiments of the invention, whenever an optimization changes the relationship of $\Sigma D_i = D_{EST}$, the invention operates to redistribute the change at 1010, as shown in FIG. 10B, to preserve the relationship of $\Sigma D_i = D_{EST}$. Accordingly, the change of 1 from 11 to 10 for bin 402*a'''* is redistribted to bins 402*b'''* and 402*c'''* of histogram data structure 430*c*, i.e., $D_1$ and $D_2$ are set to 22.5 from 22.

Figure 11:
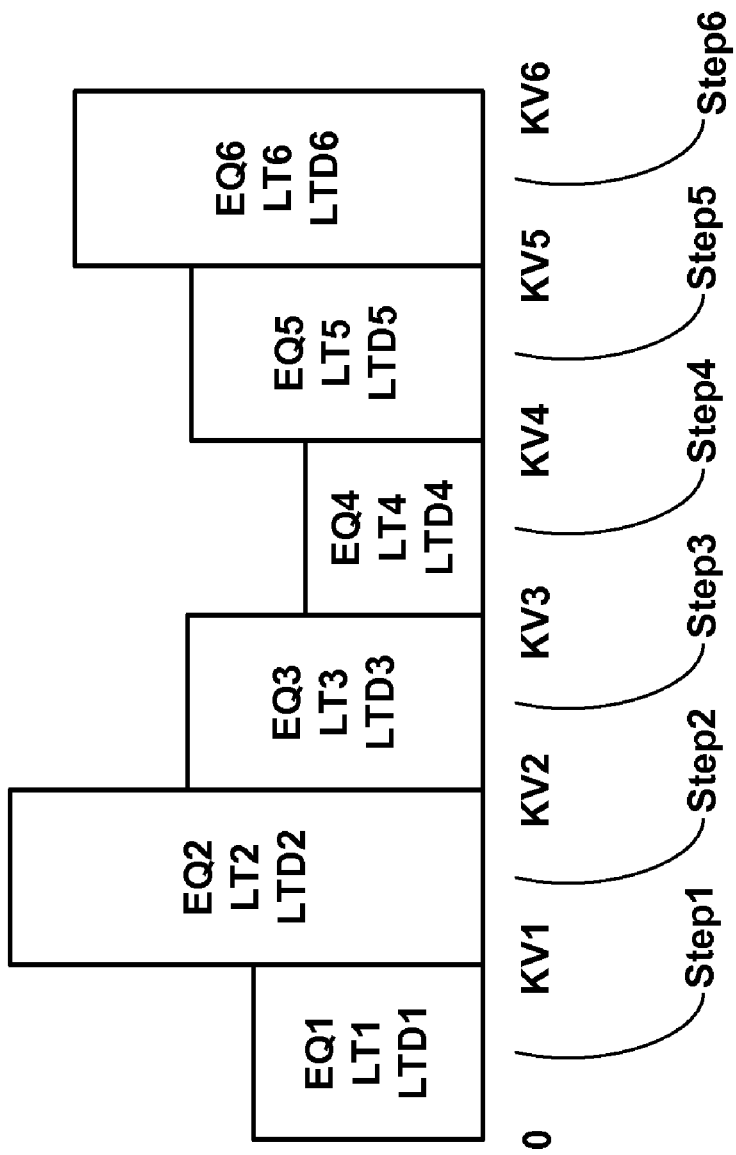
FIG. 11 illustrates an alternate representation of a histogram having steps in which key values define the upper limit for each step, and each step also includes the number of occurrences of the key value, the number of values less than the key value within the step, and the number of distinct values in the "less than" values, which representation can be scaled according to the techniques of the invention.

FIG. 11 illustrates an alternate representation of a histogram 1100 having steps Step 1, Step 2, Step 3, Step 4, Step 5 and Step 6 in which key values define the upper limit for each step. Each step also includes the number of occurrences of the key value, the number of values less than the key value within the step, and the number of distinct values in the "less than" values, which representation can be scaled according to the techniques of the invention. In this regard, one of ordinary skill in the art can appreciate that a histogram can be represented according to a variety of similar, or equivalent, formats, and that the invention can apply to any of such various representations.

For instance, structured query language (SQL) Server is an exemplary system that utilizes the format of histogram 1100 and can include from 1 to 200 steps. With SQL, each step contains 4 elements: (1) The Key Value, whereby every value captured by the step is less than or equal to the Key Value, (2) The CardEq (EQ), which is the number of values that are equal to the Key Value, (3) The CardLt (LT), which is the number of values in the step that are less than Key Value and (4) The CardLtDistinct (LTD), which is the number of distinct values less than Key Value. The steps are ordered by increasing Key Value in a SQL histogram structure.

Figure 12A:
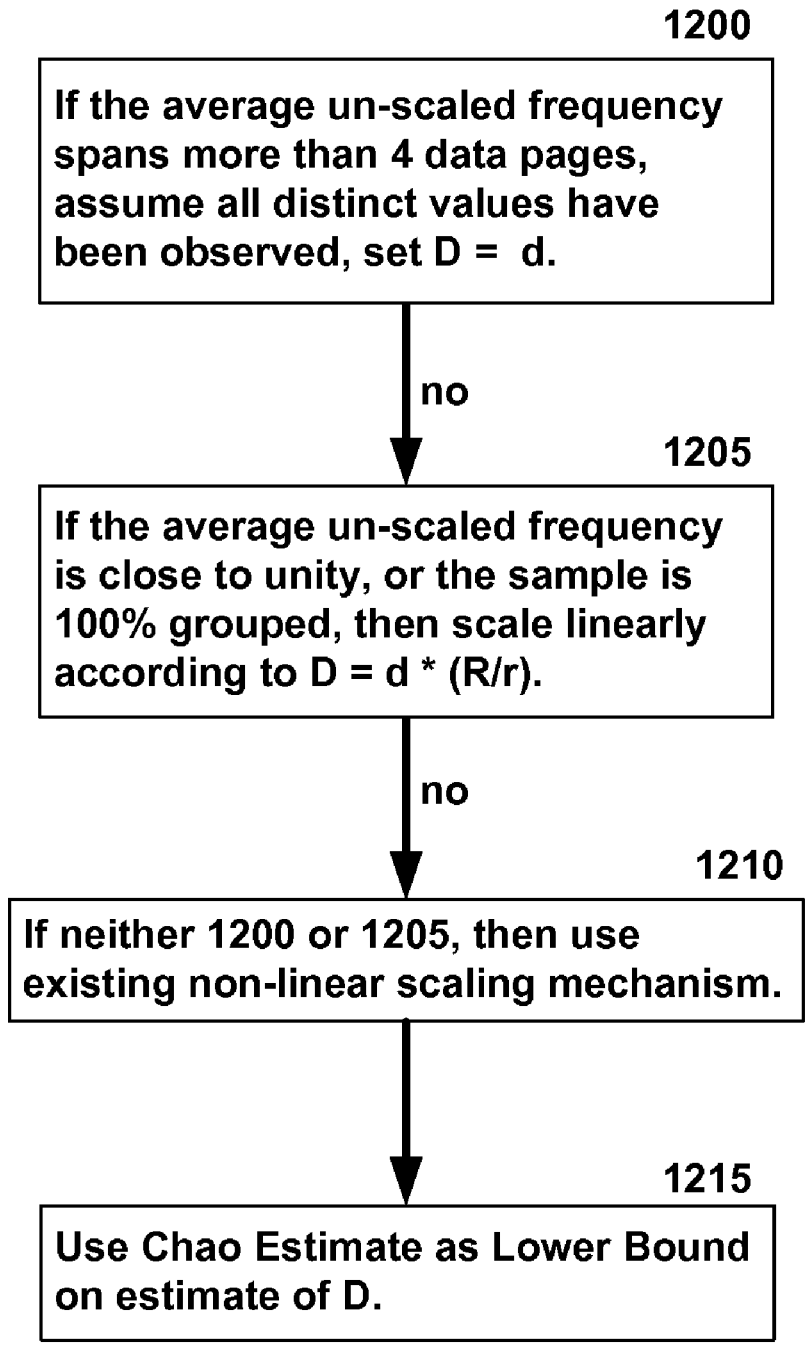
FIGS. 12A and 12B illustrate exemplary non-limiting flow diagrams for implementing one or more aspects of the invention in connection with the alternate representation of the histogram of FIG. 11.
Figure 12B:
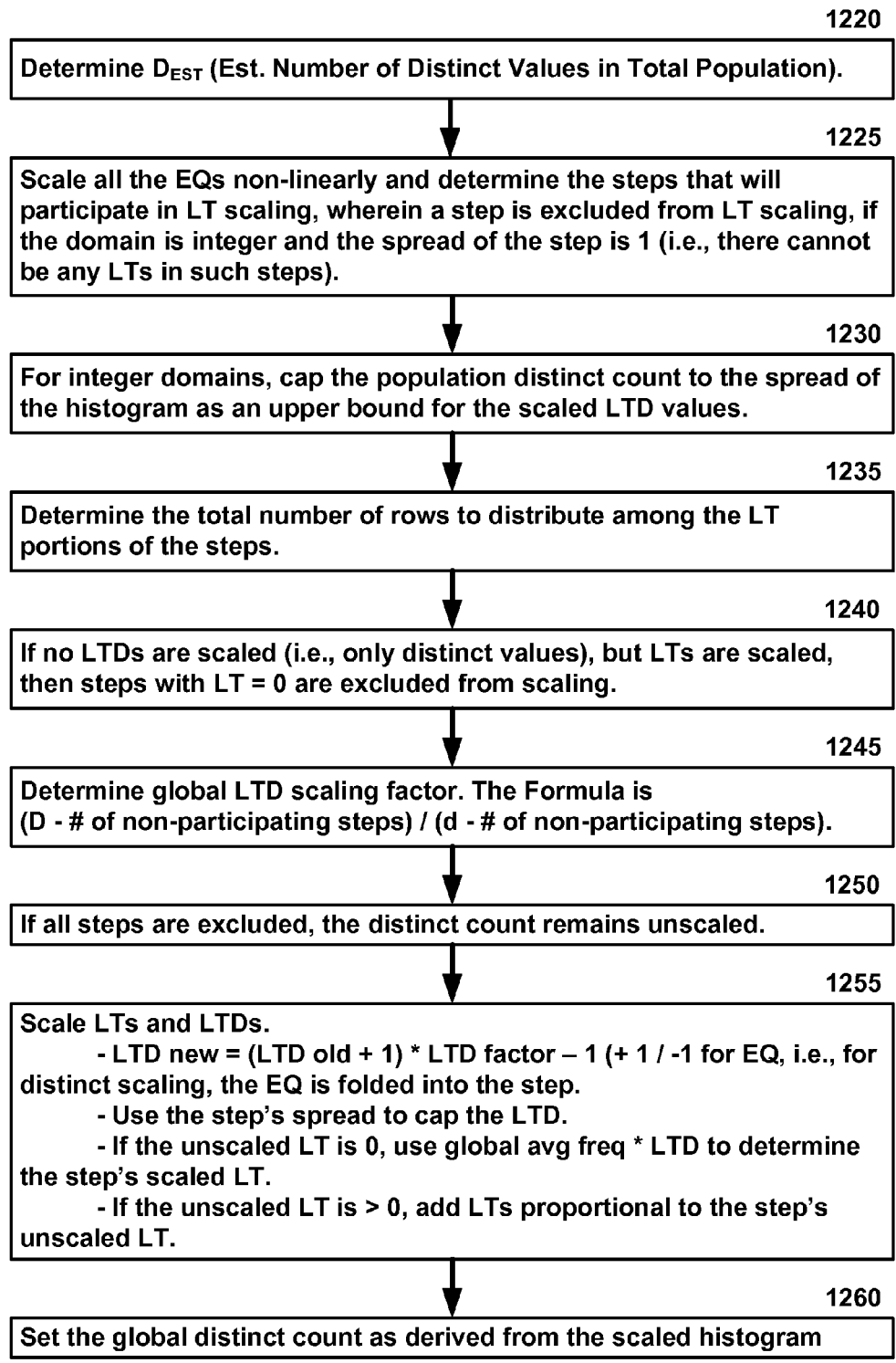
Figure 13A:
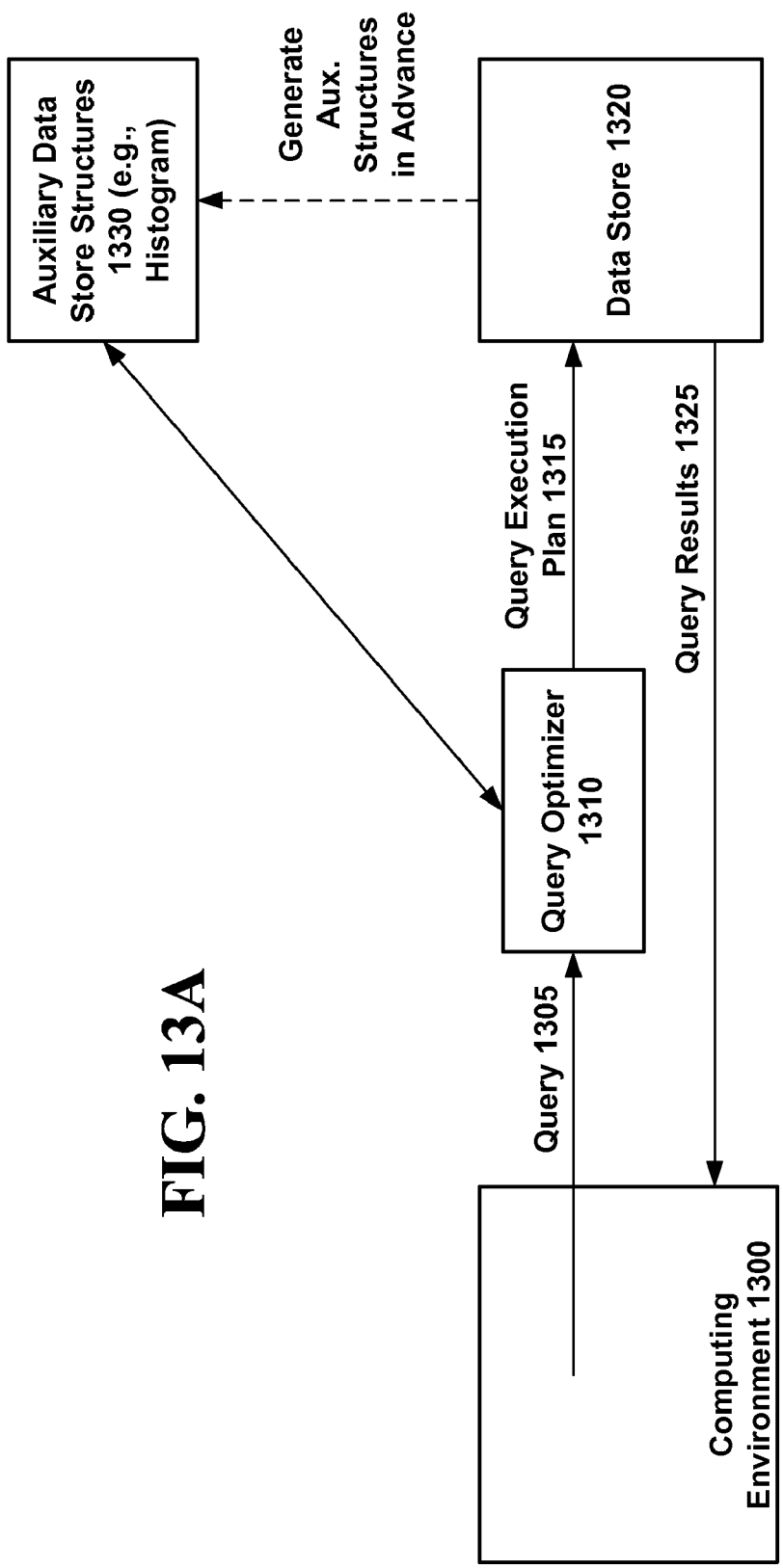
FIGS. 13A, 13B and 13C illustrate exemplary aspects of querying, histograms and page-level sampling as background, or additional context, for the invention.
Figure 13B:
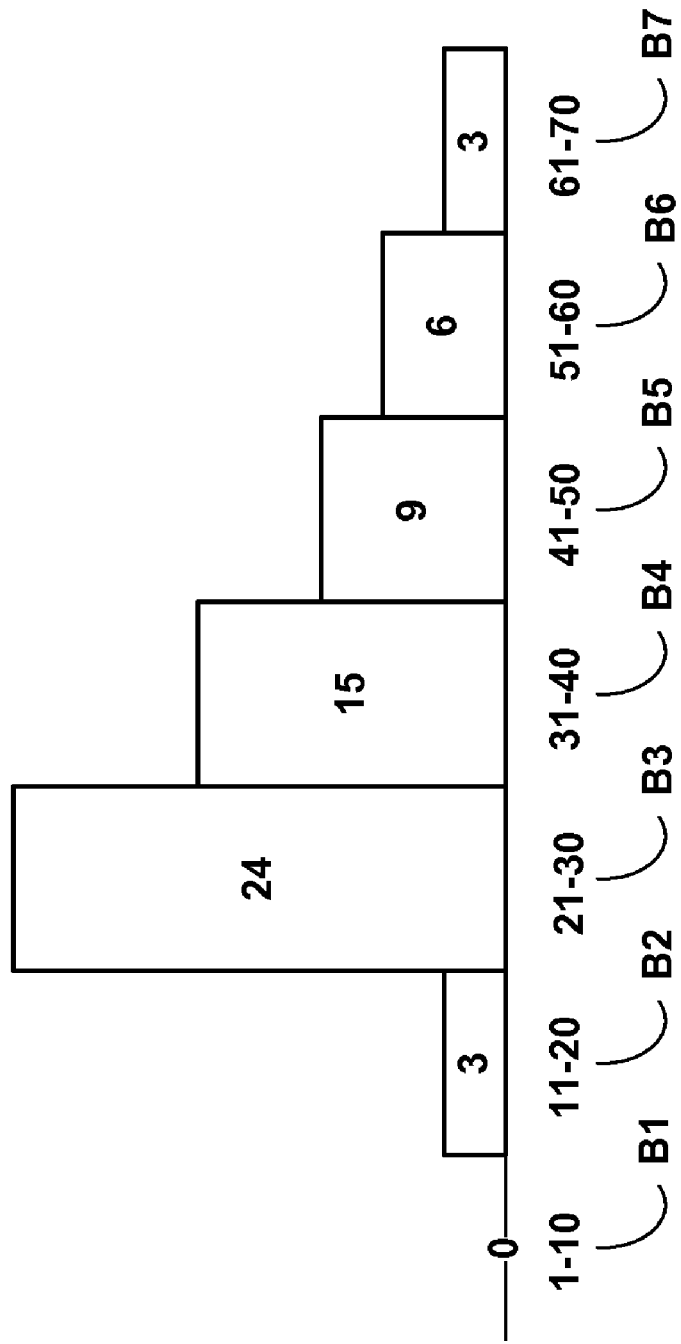
Figure 13C:
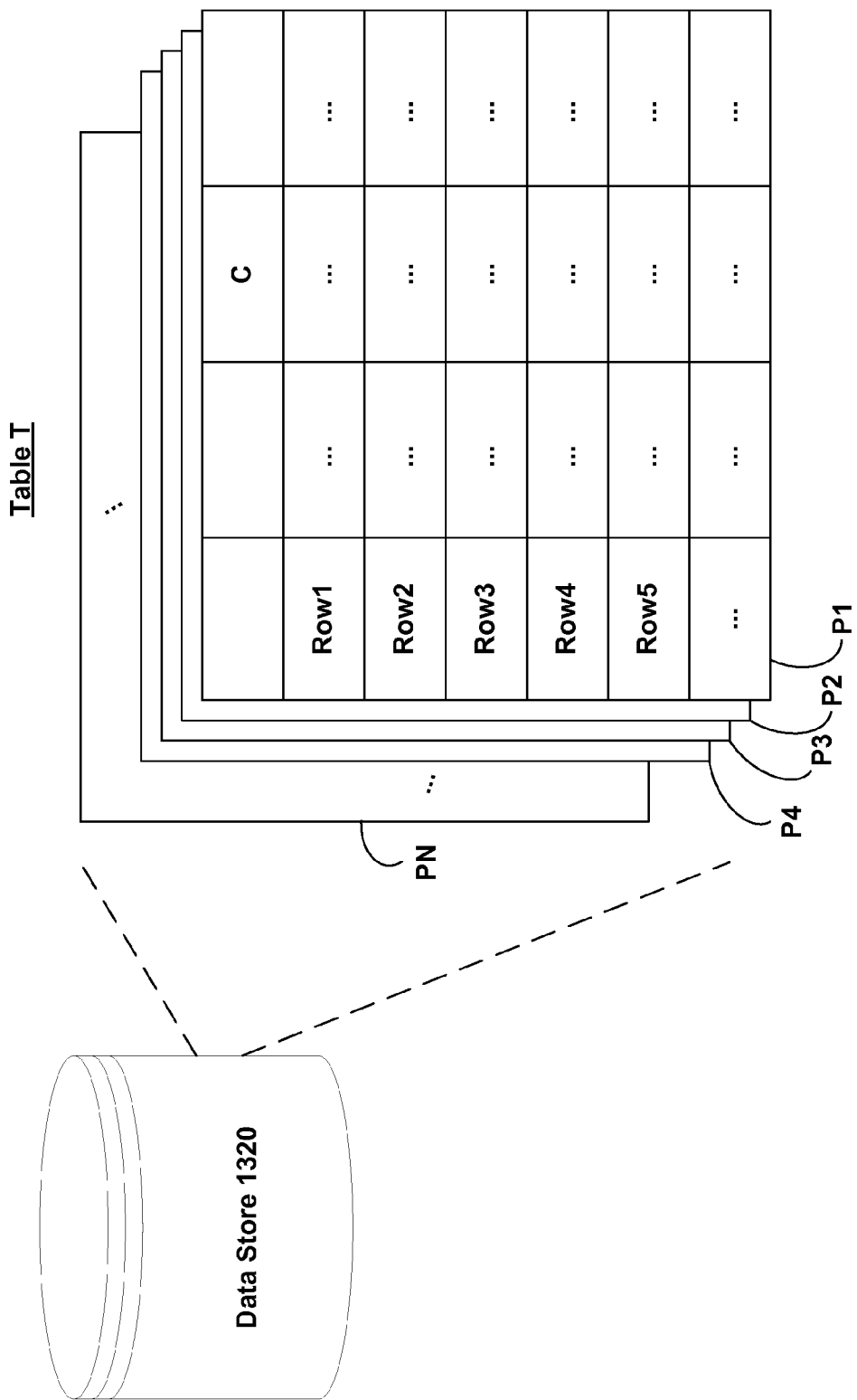

FIGS. 12A and 12B illustrate exemplary non-limiting flow diagrams for an illustrative implementation of one or more aspects of the invention described above in the context of a non-limiting SQL implementation of the invention. Some definitions for the exemplary SQL algorithms are first set forth as follows. The "spread" of a step is the difference between its Key Value and the Key Value of the previous step, i.e., the next smallest. The "un-scaled frequency" of a Key Value is the number of occurrences in the sample. In turn, the "scaled frequency" of a Key Value is the estimated number of occurrences in the entire data set.

For notation purposes in connection with the exemplary non-limiting flow diagrams of FIGS. 12A and 12B, 'r' is the number of rows in the sample and 'R' is the number of rows in the entire table. 'd' is the number distinct values observed in the sample and 'D' is the estimated number of distinct values in the entire data set.

As mentioned, the invention includes two stages. FIG. 12A illustrates an exemplary flow diagram for the first stage when an estimate of D is computed as an estimate of the distinct count of the entire table. At 1200, if the average un-scaled frequency spans more than 4 data pages, then the algorithm sets D=d because it is assumed that all distinct values have been seen. At 1205, if the average un-scaled frequency is close to unity, i.e., 1, or the sample is 100% grouped, then d is scaled linearly according to D=d*(R/r). If neither of the conditions of 1205 manifest, then optionally, the non-linear scaling formula given in the background can used at 1210. For any of the foregoing, as an additional step, at 1215, the Chao estimator can be applied as the lower bound on the estimate of D.

The second stage is illustrated in FIG. 12B where the histogram values are scaled to estimate the histogram of the overall population. Thus, at 1220, $D_{EST}$ is determined, i.e., the estimated number of distinct values in the total population. Then, at 1225, all of the EQs of the steps are scaled non-linearly and the steps are determined that will participate in LT scaling. A step is excluded from LT scaling, if the domain is integer and the spread of the step is 1, since there cannot be any LTs in such a step. Then, at 1230, for integer domains, the spread of the histogram is set as an upper bound for the scaled LTD, and the distinct count calculated in 1220 is capped accordingly.

Next, at 1235, the total number of rows to distribute among the LT portions of the steps is determined. At 1240, if LTDs are not scaled because every distinct value has been observed, but LTs are scaled, any steps with LT=0 are excluded from scaling. Such steps do not have any values and adding values would increase the LTD in a clearly inaccurate manner. Then, at 1245, a global LTD scaling factor is determined. The Formula applied is:

$$\frac{(D\text{-\# of non-participating steps})}{(d\text{-\# of non-participating steps})}.$$

At 1250, if all steps are excluded, the distinct count is not scaled at all. The LTs and LTDs are then scaled at 1555. For the scaling at 1555, LTD new=(LTD old +1)*LTD factor −1 (the +1 and −1 capture, respectively, the folding in of the EQ into the step prior to scaling and the separating out of the EQ from the step after the scaling). Additionally, the step's spread is used to cap the LTD. Moreover, if the unscaled LT is 0, the present embodiment uses (global avg freq*LTD) to determine the step's scaled LT. If the unscaled LT is >0, LTs proportional to the step's unscaled LT are added. For example, if a step had 10% of all the LTs before scaling, it will receive 10% of the LTs to distribute (computed at step 1235). Lastly, at 1260, the global distinct count is set as derived from the scaled histogram, and the scaled histogram is ready for use in connection with query optimization and the like.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with processes for scaling a histogram data structure in accordance with the present invention. The present invention may apply to an environment with server computers and client computers deployed in a network environment or a distributed computing environment, having remote or local storage. The present invention may also be applied to standalone computing devices, having programming language functionality, interpretation and execution capabilities for generating, receiving and transmitting information in connection with scaling histograms.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may implicate the systems and methods for scaling histograms of the invention.

Figure 14:
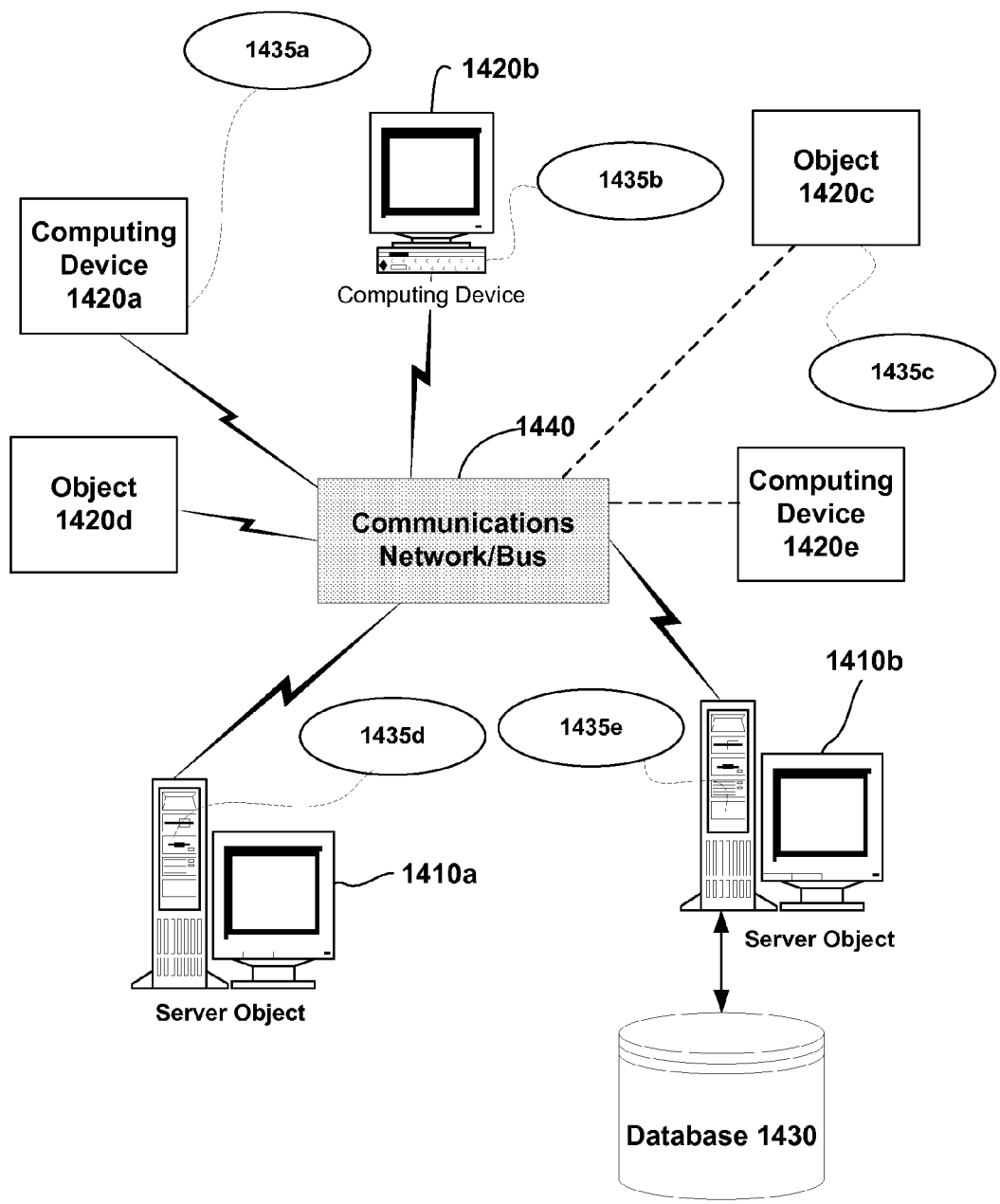
FIG. 14 is a block diagram representing an exemplary non-limiting networked environment in which the present invention may be implemented.

FIG. 14 provides a schematic diagram of an exemplary networked or distributed computing environment. The distributed computing environment comprises computing objects $1410a$, $1410b$, etc. and computing objects or devices $1420a$, $1420b$, $1420c$, $1420d$, $1420e$, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network $1440$. This network may itself comprise other computing objects and computing devices that provide services to the system of FIG. 14, and may itself represent multiple interconnected networks. In accordance with an aspect of the invention, each object $1410a$, $1410b$, etc. or $1420a$, $1420b$, $1420c$, $1420d$, $1420e$, etc. may contain an application that might make use of an API, or other object, software, firmware and/or hardware, suitable for use with the systems and methods for scaling histograms in accordance with the invention.

It can also be appreciated that an object, such as $1420c$, may be hosted on another computing device $1410a$, $1410b$, etc. or $1420a$, $1420b$, $1420c$, $1420d$, $1420e$, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to scaling histograms according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 14, as an example, computers $1420a$, $1420b$, $1420c$, $1420d$, $1420e$, etc. can be thought of as clients and computers $1410a$, $1410b$, etc. can be thought of as servers where servers $1410a$, $1410b$, etc. maintain the data that is then replicated to client computers $1420a$, $1420b$, $1420c$, $1420d$, $1420e$, etc., although any computer can be considered a client, a server, or both, depending on the circumstances. Any of these computing devices may be processing data or requesting services or tasks that may implicate scaling histograms in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for scaling histograms of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 14 illustrates an exemplary networked or distributed environment, with server(s) in communication with client computer (s) via a network/bus, in which the present invention may be employed. In more detail, a number of servers 1410a, 1410b, etc. are interconnected via a communications network/bus 1440, which may be a LAN, WAN, intranet, GSM network, the Internet, etc., with a number of client or remote computing devices 1420a, 1420b, 1420c, 1420d, 1420e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to scale histograms.

In a network environment in which the communications network/bus 1440 is the Internet, for example, the servers 1410a, 1410b, etc. can be Web servers with which the clients 1420a, 1420b, 1420c, 1420d, 1420e, etc. communicate via any of a number of known protocols such as HTTP. Servers 1410a, 1410b, etc. may also serve as clients 1420a, 1420b, 1420c, 1420d, 1420e, etc., as may be characteristic of a distributed computing environment.

As mentioned, communications may be wired or wireless, or a combination, where appropriate. Client devices 1420a, 1420b, 1420c, 1420d, 1420e, etc. may or may not communicate via communications network/bus 14, and may have independent communications associated therewith. For example, in the case of a TV or VCR, there may or may not be a networked aspect to the control thereof. Each client computer 1420a, 1420b, 1420c, 1420d, 1420e, etc. and server computer 1410a, 1410b, etc. may be equipped with various application program modules or objects 135a, 135b, 135c, etc. and with connections or access to various types of storage elements or objects, across which files or data streams may be stored or to which portion(s) of files or data streams may be downloaded, transmitted or migrated. Any one or more of computers 1410a, 1410b, 1420a, 1420b, 1420c, 1420d, 1420e, etc. may be responsible for the maintenance and updating of a database 1430 or other storage element, such as a database or memory 1430 for storing data processed or saved according to the invention. Thus, the present invention can be utilized in a computer network environment having client computers 1420a, 1420b, 1420c, 1420d, 1420e, etc. that can access and interact with a computer network/bus 1440 and server computers 1410a, 1410b, etc. that may interact with client computers 1420a, 1420b, 1420c, 1420d, 1420e, etc. and other like devices, and databases 1430.

Exemplary Computing Device

Figure 15:
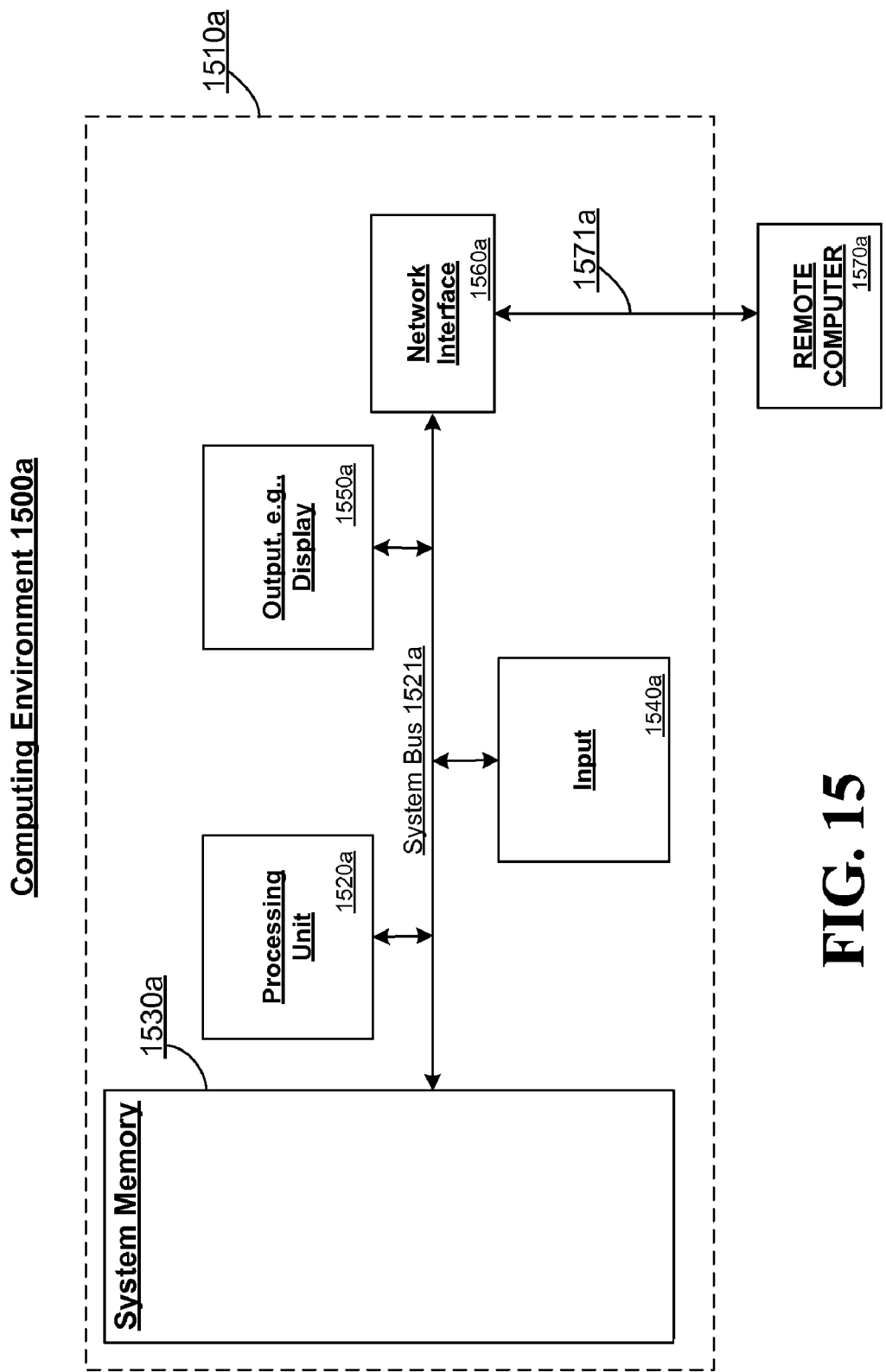
FIG. 15 is a block diagram representing an exemplary non-limiting computing system or operating environment in which the present invention may be implemented.

As mentioned, the invention applies to any device wherein it may be desirable to scale histograms to a population from a sample. It should be understood, therefore, that handheld, portable and other computing devices and computing objects of all kinds are contemplated for use in connection with the present invention, i.e., anywhere that a device may include histograms based on sample data. Accordingly, the below general purpose remote computer described below in FIG. 15 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 15 thus illustrates an example of a suitable computing system environment 1500a in which the invention may be implemented, although as made clear above, the computing system environment 1500a is only one example of a suitable computing environment for a media device and is not intended to suggest any limitation as to the scope of use or functionality of the invention. Neither should the computing environment 1500a be interpreted as having any dependency or requirement relating to any one or combination of components illustrated in the exemplary operating environment 1500a.

With reference to FIG. 15, an exemplary remote device for implementing the invention includes a general purpose computing device in the form of a computer 1510a. Components of computer 1510a may include, but are not limited to, a processing unit 1520a, a system memory 1530a, and a system bus 1521a that couples various system components including the system memory to the processing unit 1520a. The system bus 1521a may be any of several types of bus structures including a memory bus or memory controller, a peripheral bus, and a local bus using any of a variety of bus architectures.

Computer 1510a typically includes a variety of computer readable media. Computer readable media can be any available media that can be accessed by computer 1510a. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1510a. Communication media typically embodies computer readable instructions, data structures, program modules or other data in a modulated data signal such as a carrier wave or other transport mechanism and includes any information delivery media.

The system memory 1530a may include computer storage media in the form of volatile and/or nonvolatile memory such as read only memory (ROM) and/or random access memory (RAM). A basic input/output system (BIOS), containing the basic routines that help to transfer information between elements within computer 1510a, such as during start-up, may be stored in memory 1530a. Memory 1530a typically also contains data and/or program modules that are immediately accessible to and/or presently being operated on by processing unit 1520a. By way of example, and not limitation, memory 1530a may also include an operating system, application programs, other program modules, and program data.

The computer 1510a may also include other removable/non-removable, volatile/nonvolatile computer storage media. For example, computer 1510a could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1521a through a non-removable memory interface such as an interface, and a magnetic disk drive or optical disk drive is typically connected to the system bus 1521a by a removable memory interface, such as an interface.

A user may enter commands and information into the computer 1510a through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1520a through user input 1540a and associated interface(s) that are coupled to the system bus 1521a, but may be connected by other interface and bus structures, such as a parallel port, game port or a universal serial bus (USB). A graphics subsystem may also be connected to the system bus 1521a. A monitor or other type of display device is also connected to the system bus 1521a via an interface, such as output interface 1550a, which may in turn communicate with video memory. In addition to a monitor, computers may also include other peripheral output devices such as speakers and a printer, which may be connected through output interface 1550a.

The computer 1510a may operate in a networked or distributed environment using logical connections to one or more other remote computers, such as remote computer 1570a, which may in turn have media capabilities different from device 1510a. The remote computer 1570a may be a personal computer, a server, a router, a network PC, a peer device or other common network node, or any other remote media consumption or transmission device, and may include any or all of the elements described above relative to the computer 1510a. The logical connections depicted in FIG. 15 include a network 1571a, such local area network (LAN) or a wide area network (WAN), but may also include other networks/buses. Such networking environments are commonplace in homes, offices, enterprise-wide computer networks, intranets and the Internet.

When used in a LAN networking environment, the computer 1510a is connected to the LAN 1571a through a network interface or adapter. When used in a WAN networking environment, the computer 1510a typically includes a communications component, such as a modem, or other means for establishing communications over the WAN, such as the Internet. A communications component, such as a modem, which may be internal or external, may be connected to the system bus 1521a via the user input interface of input 1540a, or other appropriate mechanism. In a networked environment, program modules depicted relative to the computer 1510a, or portions thereof, may be stored in a remote memory storage device. It will be appreciated that the network connections shown and described are exemplary and other means of establishing a communications link between the computers may be used.

Exemplary Distributed Computing Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for scaling histograms in accordance with the invention may be included in, supported in or accessed via all of the languages and services enabled by managed code, such as .NET code, and in other distributed computing frameworks as well.

There are multiple ways of implementing the present invention, e.g., an appropriate API, tool kit, driver code, operating system, control, standalone or downloadable software object, etc. which enables applications and services to use the systems and methods for scaling histograms of the invention. The invention contemplates the use of the invention from the standpoint of an API (or other software object), as well as from a software or hardware object that receives a downloaded program in accordance with the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to scale a histogram to a population from a sample data. For instance, the histogram scaling of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the histogram scaling of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIGS. 1, 3, 5-7, 9A,12A and 12B. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers ... ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide methods for scaling histograms. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A computer-implemented method comprising:
    employing a processor to facilitate execution of computer-executable instructions that, when executed, cause operations to be performed, comprising:
        determining an estimate of a number of distinct values in a population data set from a sample data set taken from the population data set; and
        setting a Chao estimator as a lower bound for the estimate of the number of distinct values in the population data set, the Chao estimator being a function of the estimated number of distinct values in the population data set, a number of distinct values in the sample data set, and a number of values that appear a selected number of times in the sample data set, the selected number of times being greater than one,
    the determining including:
        determining whether a number of duplicates in the sample data is greater than a first threshold amount;
        determining that the estimate of the number of distinct values in the population data set is equal to the number of distinct values in the sample data set when it is determined that the number of duplicates in the sample data is greater than the first threshold amount;
        determining whether a number of duplicates in the sample data is less than a second threshold amount;
        determining the estimate of the number of the distinct values in the population data set by linearly scaling the number of duplicates in the sample data when it is determined that the number of duplicates in the sample data is less than the second threshold amount; and
        determining the estimate of the number of the distinct values in the population data set by non-linearly scaling the number of duplicates in the sample data when the number of duplicates in the sample data is more than the second threshold amount and less than the first threshold amount, and
    the setting including resetting the estimate of the number of the distinct values in the population data set to the Chao estimator when the Chao estimator is greater than the estimate of the number of the distinct values in the population data set.

2. The computer-implemented method of claim 1, further comprising scaling a histogram based on the sample data set to derive an estimate of a histogram representing the population data set.

3. The computer-implemented method of claim 2, wherein the scaling comprises determining whether the sample data set includes at least a predetermined number of duplicate values relative to the population data set.

4. The computer-implemented method of claim 1, further comprising calculating the Chao estimator according to the following equation:

$$D = d + \frac{f_1^2}{2f_2},$$

D being representative of the estimate of the number of distinct values in the population data set, d represents the number of distinct values in the sample data set, $f_1$ represents a number of values that appear exactly once in the sample data set, and $f_2$ represents a number of values that appear exactly twice in the sample data set.

5. The computer-implemented method of claim 1, further comprising:
    determining a second estimated amount of a number of distinct values in a histogram bin for the population data set; and
    resetting the second estimated amount to a histogram bin threshold value if the second estimated amount is greater than the histogram bin threshold value.

6. The computer-implemented method of claim 5, wherein resetting the second estimated amount includes determining an excess amount by which the second estimated amount is greater than the histogram bin threshold value, and redistributing the excess amount to one or more other estimated amounts of the respective number of distinct values in one or more other histogram bins for the population data set, redistributing causing the sum of the second estimated amount and the one or more other estimated amounts to equal the estimate of the number of distinct values in the population data set.

7. The computer-implemented method of claim 6, wherein redistributing includes redistributing the excess amount equally amongst the one or more other estimated amounts.

8. A computer-implemented database system, comprising:
a processor;
a server object configured to:
determine an estimate of a number of distinct values in a population data set from a sample data set taken from the population data set;
set a Chao estimator as a lower bound for the estimate of distinct values in the population data set, the Chao estimator being a function of the estimate of the number of distinct values in the population data set, a number of distinct values in a sample data set, and a number of values that appear a selected number of times in the sample data set, the selected number of times being greater than one;
determine whether a number of duplicates in the sample data is greater than a first threshold amount; and
determine that the estimate of the number of distinct values in the population data set is equal to the number of distinct values in the sample data set when it is determined that the number of duplicates in the sample data is greater than the first threshold amount;
determine whether a number of duplicates in the sample data is less than a second threshold amount;
determine the estimate of the number of the distinct values in the population data set by linearly scaling the number of duplicates in the sample data when it is determined that the number of duplicates in the sample data is less than the second threshold amount;
determine the estimate of the number of the distinct values in the population data set by non-linearly scaling the number of duplicates in the sample data when the number of duplicates in the sample data is more than the second threshold amount and less than the first threshold amount; and
reset the estimate of the number of the distinct values in the population data set to the Chao estimator when the Chao estimator is greater than the estimate of the number of the distinct values in the population data set; and
a computer-readable storage medium storing instructions that, when executed by the processor, cause the processor to implement the server object.

9. The computer-implemented database system of claim 8, wherein the server object is further configured to scale a histogram based on the sample data set to derive an estimate of a histogram representing the population data set.

10. The computer-implemented database system of claim 9, wherein the scaling comprises determining whether the sample data set includes at least a predetermined number of duplicate values relative to the population data set.

11. The computer-implemented database system of claim 8, wherein the server object is further configured to calculate the Chao estimator according to the following equation:

$$D = d + \frac{f_1^2}{2f_2},$$

D being representative of the estimate of the number of distinct values in the population data set, d represents the number of distinct values in the sample data set, $f_1$ represents a number of values that appear exactly once in the sample data set, and $f_2$ represents a number of values that appear exactly twice in the sample data set.

12. The computer-implemented database system of claim 8, wherein the server object is a structured query language server.

13. The computer-implemented database system of claim 8, further comprising a data store having the population data set.

14. A computer-readable storage media, the computer-readable media not being a signal per se, storing computer-executable instructions that, when executed by at least one processor, cause operations to be performed, comprising:
determining an estimate of a number of distinct values in a population data set from a sample data set taken from the population data set; and
setting a Chao estimator as a lower bound for the estimate of the number of distinct values in the population data set, the Chao estimator being a function of the estimated number of distinct values in the population data set, a number of distinct values in the sample data set, and a number of values that appear a selected number of times in the sample data set, the selected number of times being greater than one,
the determining including:
determining whether a number of duplicates in the sample data is greater than a first threshold amount;
determining that the estimate of the number of distinct values in the population data set is equal to the number of distinct values in the sample data set when it is determined that the number of duplicates in the sample data is greater than the first threshold amount;
determining whether a number of duplicates in the sample data is less than a second threshold amount;
determining the estimate of the number of the distinct values in the population data set by linearly scaling the number of duplicates in the sample data when it is determined that the number of duplicates in the sample data is less than the second threshold amount; and
determining the estimate of the number of the distinct values in the population data set by non-linearly scaling the number of duplicates in the sample data when the number of duplicates in the sample data is more than the second threshold amount and less than the first threshold amount, and
the setting including resetting the estimate of the number of the distinct values in the population data set to the Chao estimator when the Chao estimator is greater than the estimate of the number of the distinct values in the population data set.

15. The computer-readable storage media of claim 14, the operations further comprising scaling a histogram based on the sample data set to derive an estimate of a histogram representing the population data set.

16. The computer-readable storage media of claim 15, wherein the scaling comprises determining whether the sample data set includes at least a predetermined number of duplicate values relative to the population data set.

17. The computer-readable storage media of claim 14, the operations further comprising calculating the Chao estimator according to the following equation:

$$D = d + \frac{f_1^2}{2f_2},$$

D being representative of the estimate of the number of distinct values in the population data set, d represents the number of distinct values in the sample data set, $f_1$ represents a number of values that appear exactly once in the sample data set, and $f_2$ represents a number of values that appear exactly twice in the sample data set.

18. The computer-readable storage media of claim 14, the operations further comprising:
  determining a second estimated amount of a number of distinct values in a histogram bin for the population data set; and
  resetting the second estimated amount to a histogram bin threshold value if the second estimated amount is greater than the histogram bin threshold value.

19. The computer-readable storage media of claim 18, wherein resetting the second estimated amount includes determining an excess amount by which the second estimated amount is greater than the histogram bin threshold value, and redistributing the excess amount to one or more other estimated amounts of the respective number of distinct values in one or more other histogram bins for the population data set, redistributing causing the sum of the second estimated amount and the one or more other estimated amounts to equal the estimate of the number of distinct values in the population data set.

20. The computer-readable storage media of claim 19, wherein redistributing includes redistributing the excess amount equally amongst the one or more other estimated amounts.

\* \* \* \* \*